United States Patent
Hata et al.

(10) Patent No.: US 10,538,044 B2
(45) Date of Patent: *Jan. 21, 2020

(54) METHOD FOR PRODUCING V-RIBBED BELT

(71) Applicant: BANDO CHEMICAL INDUSTRIES, LTD., Kobe-shi, Hyogo (JP)

(72) Inventors: Tomoaki Hata, Kobe (JP); Kouichi Tsujino, Kobe (JP); Koichi Hosokawa, Kobe (JP); Hisashi Izumi, Kobe (JP); Masaki Miyanishi, Kobe (JP); Hirokazu Sakurai, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,207

(22) Filed: Sep. 28, 2018

(65) Prior Publication Data

US 2019/0030845 A1 Jan. 31, 2019

Related U.S. Application Data

(63) Continuation of application No. PCT/JP2017/006808, filed on Feb. 23, 2017.

(30) Foreign Application Priority Data

Mar. 30, 2016 (JP) .................................. 2016-069522

(51) Int. Cl.
*B29D 29/10* (2006.01)
*B29C 43/52* (2006.01)
(Continued)

(52) U.S. Cl.
CPC ............ *B29D 29/103* (2013.01); *B29C 35/02* (2013.01); *B29C 43/18* (2013.01); *B29C 43/52* (2013.01);
(Continued)

(58) Field of Classification Search
CPC ...... B29D 29/10; B29D 29/103; B29D 29/08; F16G 5/06; F16G 5/08; B29C 47/0042
USPC ..................... 156/138; 264/241, 49; 29/33 S
See application file for complete search history.

(56) References Cited

U.S. PATENT DOCUMENTS 3,464,875 A 9/1969 Brooks et al.
4,359,355 A * 11/1982 Stecklein ............. B29D 29/106
156/138

(Continued)

FOREIGN PATENT DOCUMENTS

JP H11-309788 A 11/1999
JP 2003-191345 A 7/2003
(Continued)

*Primary Examiner* — Matthew J Daniels
*Assistant Examiner* — Yunju Kim
(74) *Attorney, Agent, or Firm* — Maschoff Brennan

(57) ABSTRACT

Provided is a method for producing a V-ribbed belt having a plurality of V-shaped ribs extending in a longitudinal direction and arranged in a width direction. The method includes: setting a shaped structure having a plurality of ridges arranged adjacent to one another in a belt mold including a plurality of compressed rubber layer-shaping grooves arranged adjacent to one another on an inner peripheral surface of the mold; molding a belt slab by crosslinking the shaped structure set in the mold, while compressed rubber layer-forming portions face radially outward and are fitted in the compressed rubber layer-shaping grooves, the compressed rubber layer-forming portions comprised of a surface rubber layer and a core rubber layer which are to constitute surface and inner portions, respectively; and cutting the belt slab into ring-shaped pieces having two or more of the compressed rubber layer-forming portions.

19 Claims, 26 Drawing Sheets

(51) Int. Cl.
    *B29C 43/18*     (2006.01)
    *B29C 35/02*     (2006.01)
    *F16G 5/06*     (2006.01)
    *F16G 5/08*     (2006.01)
    *F16G 5/20*     (2006.01)
    *B29K 9/00*     (2006.01)
    *B29K 105/00*     (2006.01)
    *B29K 105/24*     (2006.01)
    *B29K 307/04*     (2006.01)

(52) U.S. Cl.
    CPC ............ *B29D 29/10* (2013.01); *F16G 5/06* (2013.01); *F16G 5/08* (2013.01); *F16G 5/20* (2013.01); *B29K 2009/00* (2013.01); *B29K 2105/0038* (2013.01); *B29K 2105/0044* (2013.01); *B29K 2105/24* (2013.01); *B29K 2307/04* (2013.01)

(56) References Cited

U.S. PATENT DOCUMENTS

| | | | |
|---|---|---|---|
| 7,305,744 B2 * | 12/2007 | Hara | B29D 29/08 29/33 S |
| 9,111,192 B2 | 8/2015 | Matsumura et al. | |
| 2003/0017900 A1 * | 1/2003 | Kopang | B29D 29/00 474/260 |
| 2003/0073533 A1 * | 4/2003 | Knutson | B29D 29/08 474/263 |
| 2009/0291796 A1 * | 11/2009 | Mitsutomi | B29D 29/103 474/252 |
| 2011/0028257 A1 * | 2/2011 | Sealey | C08K 3/04 474/263 |
| 2014/0103562 A1 | 4/2014 | Okubo et al. | |
| 2019/0084191 A1 * | 3/2019 | Scholzen | B29C 70/541 |

FOREIGN PATENT DOCUMENTS

| | | |
|---|---|---|
| JP | 2004-174772 A | 6/2004 |
| JP | 2004-188776 A | 7/2004 |
| JP | 2008-30460 A | 2/2008 |
| JP | 2011-190916 A | 9/2011 |
| JP | 6156881 B2 | 3/2013 |
| JP | 2013-145032 A | 7/2013 |
| JP | 2014-32618 A | 2/2014 |
| WO | 2012/172717 A1 | 12/2012 |

\* cited by examiner

METHOD FOR PRODUCING V-RIBBED BELT

CROSS-REFERENCE TO RELATED APPLICATIONS

This is a continuation of International Application No. PCT/JP2017/006808 filed on Feb. 23, 2017, which claims priority to Japanese Patent Application No. 2016-069522 filed on Mar. 30, 2016. The entire disclosures of these applications are incorporated by reference herein.

BACKGROUND

The present disclosure relates to a method for producing a V-ribbed belt.

When an uncrosslinked rubber composition containing short fibers is extrusion molded into an uncrosslinked rubber sheet, the short fibers are insufficiently oriented in the uncrosslinked rubber sheet. It is therefore difficult to produce a V-ribbed belt which is inexpensive, unlikely to generate a noise, and has a high wear resistance by using the uncrosslinked rubber sheet. For this reason, in practice, an uncrosslinked rubber sheet for forming V-shaped ribs in which short fibers are oriented in the width direction is prepared in the following manner. An uncrosslinked rubber composition containing the short fibers blended therein is kneaded, and then rolled with a calender to form an uncrosslinked rubber sheet in which the short fibers are oriented in the length direction. Subsequently, the uncrosslinked rubber sheet is cut perpendicularly to the length direction at regular intervals into rubber pieces. The rubber pieces are joined together at its sides, thereby forming the uncrosslinked rubber sheet. However, this method requires use of expensive short fibers, and the orientation of the short fibers must be precisely controlled.

To address this problem, as disclosed in, for example, Japanese Patent No. 5156881 directed to a production method of a V-ribbed belt, it has been known that an uncrosslinked rubber sheet for a compressed rubber layer is prepared by extrusion molding an uncrosslinked rubber composition which includes no short fibers but contains hollow particles and/or a foaming agent blended therein.

SUMMARY

It is effective in reducing the cost of a belt to form a surface rubber from an expensive rubber that has a low friction coefficient and is heat resistant, and form an inner rubber from an inexpensive pure rubber.

When a two-layer rubber sheet is produced by molding flat sheets or by two-color extrusion, the resultant surface layer has a nonuniform thickness, bringing about a situation which is especially adverse to the performance of a belt: almost no surface rubber layer is formed at bottom portions of ribs. In this case, even a small amount of abrasion causes the inner rubber to be exposed and increases the coefficient of friction. Consequently, the belt generates a noise.

In view of the foregoing background, it is therefore an object of the present disclosure to enable production of an inexpensive V-ribbed belt which is unlikely to generate a noise and has a high wear resistance without having to use expensive short fibers.

To achieve the above object, the present disclosure is based on a method for producing a V-ribbed belt including a compressed rubber layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a surface rubber layer.

The method includes:

setting a shaped structure and a surface rubber sheet which is to constitute the surface rubber layer in a belt mold such that the shaped structure and the surface rubber sheet are respectively positioned inside and outside with respect to each other, the shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure, the belt mold including a plurality of compressed rubber layer-shaping grooves arranged in a groove width direction;

molding a cylindrical belt slab by crosslinking the shaped structure set in the belt mold through heating and pressing the shaped structure toward the belt mold, while each of compressed rubber layer-forming portions is fitted in an associated one of the compressed rubber layer-shaping grooves of the belt mold, the compressed rubber layer-forming portions being comprised of the plurality of ridges, of the shaped structure, each covered with the surface rubber sheet and together forming the compressed rubber layer, the crosslinking involving integration of the shaped structure with the surface rubber sheet; and cutting the belt slab into ring-shaped pieces each including two or more of the plurality of compressed rubber layer-forming portions that are to constitute the plurality of V-shaped ribs.

Thus, the shaped structure, which is in a cylindrical shape and has the plurality of ridges formed to be adjacent to one another in the axial direction in advance so as to constitute the plurality of V-shaped ribs of the compressed rubber layer, is covered with the surface rubber layer, or the surface rubber sheet is wrapped around the core rubber sheet. The resultant structure is heated and pressed toward the belt mold to be crosslinked, while each of the compressed rubber layer-forming portions is fitted in an associated one of the compressed rubber layer-shaping grooves of the belt mold, thereby molding the belt slab. The belt slab is cut into ring-shaped pieces each having two or more of the compressed rubber layer-forming portions. This feature makes it unlikely that the surface rubber layer has a nonuniform thickness. As a result, a situation which is adverse to the performance of the belt, i.e., the situation where almost no surface rubber layer is formed at bottom portions of ribs is substantially avoided. Hence, a situation where even a small amount of abrasion causes the inner rubber to be exposed and increases the coefficient of friction, and the belt generates a noise is substantially avoided, and the durability of the surface rubber layer is ensured. Note that the expression "the surface rubber sheet is wrapped around the core rubber sheet" refers to, but is not limited to, a state in which the surface rubber sheet is wrapped into a cylindrical shape, and a state in which the wrapped surface rubber sheet is slack and partially enters grooves between the plurality of ridges. The expression "the core rubber sheet is covered with the surface rubber sheet" refers to, but is not limited to, a state in which the surface rubber sheet is affixed to a surface of the core rubber sheet. The mold is not limited to the cylindrical shape, but may be a plate-shaped belt mold having a plurality of compressed rubber layer-shaping grooves arranged adjacent to one another in a groove width direction.

The belt mold may have a cylindrical shape having, on an inner peripheral surface thereof, the plurality of compressed rubber layer-shaping grooves extending in a circumferential direction and arranged adjacent to one another in an axial direction of the belt mold, and the shaped structure may be placed in the belt mold. This feature allows the entire shaped structure to be crosslinked at once, making the crosslinking step very simple.

Optionally, the surface rubber sheet may be shaped to have a corrugated cross section having the same pitches as those of the core rubber layer-forming portions in advance, and then, disposed such that portions of the surface rubber sheet protruding toward the core rubber layer-forming portions are positioned at grooves between the core rubber layer-forming portions. This may make it easy to achieve a two-layer structure. This allows the surface rubber sheet to loosely fit the core rubber sheet, making it possible to effectively prevent the surface rubber sheet from stretching locally.

The surface rubber sheet which originally has a flat shape may be continuously passed between a pair of plate-shaped or rolled members configured to pleat the surface rubber sheet, so that pitches of the surface rubber sheet pleated gradually decrease in a length direction. With this feature, the surface rubber sheet can be reliably shaped to fit the surfaces of the core rubber layer-forming portions in a simple manner.

The setting the shaped structure and the surface rubber sheet in the belt mold may be carried out such that the compressed rubber layer-forming portions are fitted in the compressed rubber layer-shaping grooves. With this feature, fitting the compressed rubber layer-forming portions in the compressed rubber layer-shaping grooves in advance reduces flow in the rubber, thereby enabling the production of the V-ribbed belt having a stable structure.

The shaped structure may be pressed toward the belt mold by expanding an expansion sleeve disposed inward of the shaped structure and by causing the expansion sleeve to press the shaped structure from inside.

A tensile member may be provided between the shaped structure and the expansion sleeve, the tensile member being comprised of an uncrosslinked rubber composition formed into a cylindrical shape and having a cord embedded therein and forming a helical pattern with pitches in an axial direction of the tensile member.

The tensile member may be provided on the expansion sleeve before the expansion sleeve is expanded.

A gap is provided between the tensile member and the expansion sleeve before the expansion sleeve is expanded.

The shaped structure and the tensile member may be brought into contact with each other before the expansion sleeve is expanded.

A gap may be provided between the shaped structure and the tensile member before the expansion sleeve is expanded.

The present disclosure enables production of an inexpensive V-ribbed belt which is unlikely to generate a noise and has a high wear resistance without having to use expensive short fibers.

DETAILED DESCRIPTION

Embodiments will be described in detail below with reference to the drawings.

Figure 1:
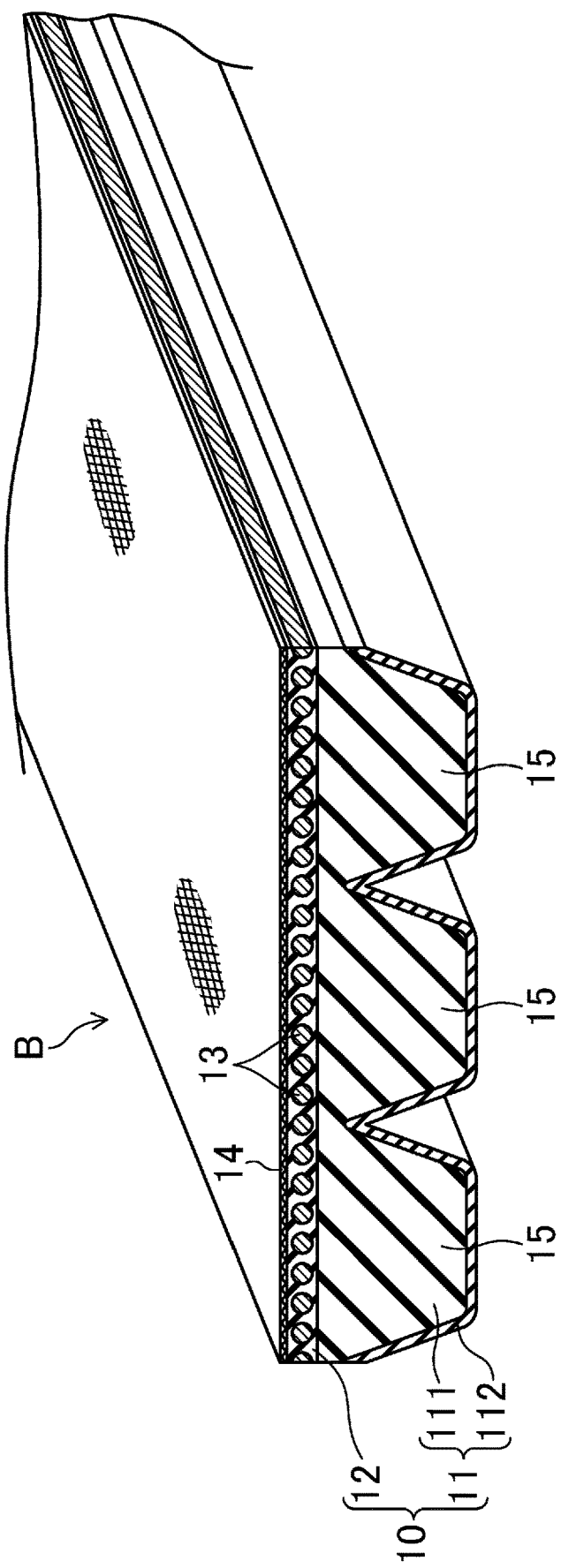
FIG. 1 is a perspective view of a V-ribbed belt produced by first to seventh production methods according to an embodiment.
Figure 2:
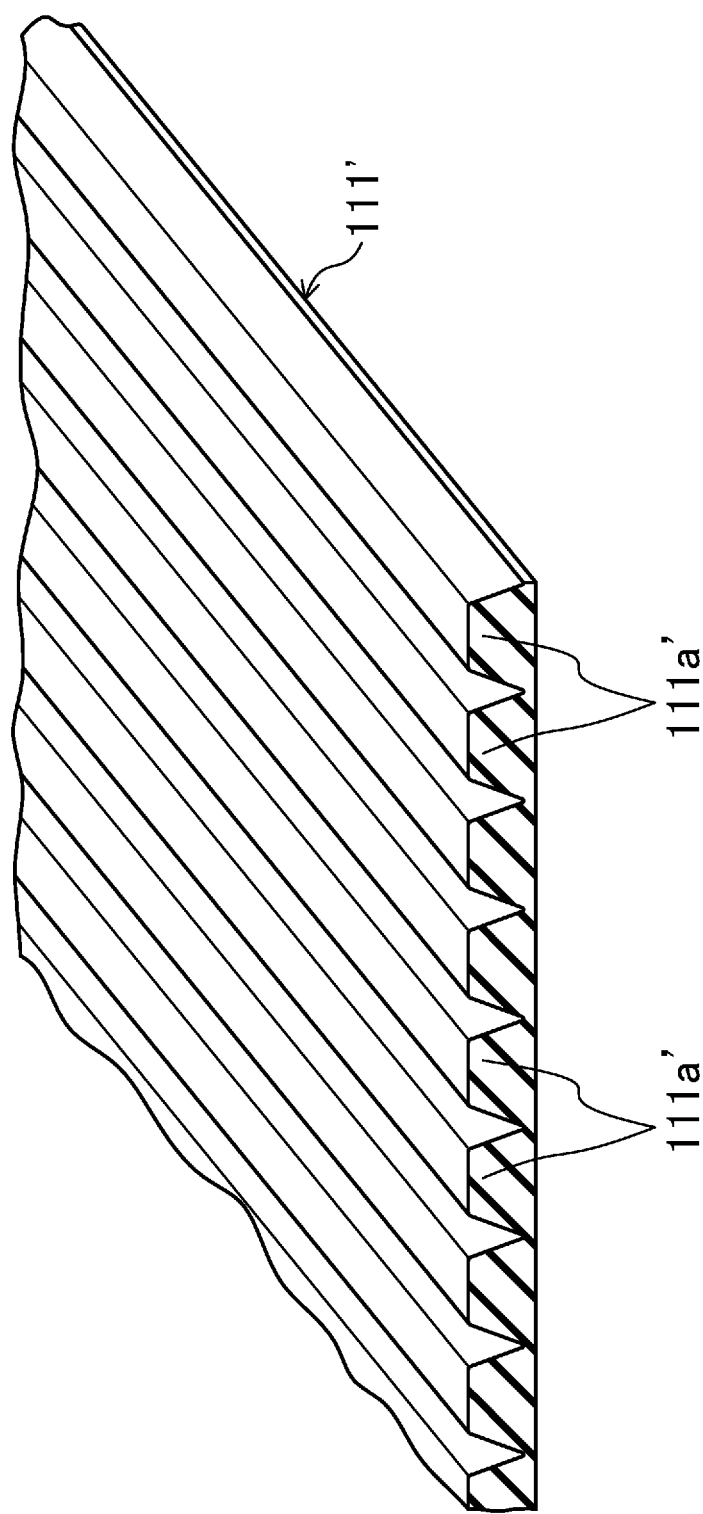
FIG. 2 is a perspective view of a core rubber sheet for use in the first production method.

FIG. 1 shows a V-ribbed belt B produced by production methods according to an embodiment. The V-ribbed belt B is usable as a power transmission member for various machines. For example, the V-ribbed belt B has a length of 700 mm to 3000 mm, a width of 10 mm to 36 mm, and a thickness of 4.0 mm to 5.0 mm.

The V-ribbed belt B of this embodiment is comprised of a rubber-made belt body 10 including a core rubber layer 111 which forms an inner peripheral portion of the belt B and an adhesive rubber layer 12 which forms an outer peripheral portion of the belt B. The inner and outer peripheral portions face each other in the thickness direction of the belt B. The core rubber layer 111 has a surface covered with a surface rubber layer 112. The core rubber layer 111 and the surface rubber layer 112 form a compressed rubber layer 11 including a plurality of V-shaped ribs 15 which extend in the longitudinal direction on the inner peripheral side of the belt in the thickness direction and which are arranged side-by-side in the belt width direction. A cord 13 is embedded in a middle portion, in the thickness direction, of the adhesive rubber layer 12. The cord 13 forms, in the adhesive rubber layer 12, a helical pattern having pitches in the width direction. A reinforcing fabric 14 is attached to the outer peripheral side of the adhesive rubber layer 12, i.e., the back face of the belt. Note that the V-ribbed belt B may include a stretch rubber layer instead of the reinforcing fabric 14. Thus, the rubber-made belt body may include the compressed rubber layer, the adhesive rubber layer, and the stretch rubber layer.

The compressed rubber layer 11 has the plurality of V-shaped ribs 15 that form a pulley contacting portion and protrude away from the outer peripheral side of the belt. Each of the plurality of V-shaped ribs 15 has the shape of a ridge extending in the belt length direction and having an approximately inverted triangular cross section. The V-shaped ribs 15 are arranged parallel to one another in the belt width direction. Each V-shaped rib 15 has, for example, a height of 2.0 mm to 3.0 mm, and a width of 1.0 mm to 3.6 mm at the rib base end. The number of the ribs ranges, for example, from 3 to 6 (3 ribs in FIG. 1).

The surface rubber layer 112 and the core rubber layer 111 are made of different crosslinked rubber compositions, each of which is produced by crosslinking, through heating and pressurization, an uncrosslinked rubber composition prepared by kneading a rubber component and various compound ingredients together.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One of these substances or a blend of two or more of these substances is suitably used as the rubber component. Examples of the compound ingredients include a reinforcing material (such as a carbon black), a filler, a plasticizer, a processing aid, a crosslinking agent, a co-crosslinking agent, a vulcanization accelerator, a vulcanization accelerator aid, and an antioxidant. Apart from the foregoing ingredients, examples of the compound ingredients which can be blended with the rubber composition forming the surface rubber layer 112 include surface texture modifiers such as short fibers, fluororesin powder, polyethylene resin powder, hollow particles, and a foaming agent.

The cord 13 is made of a twisted yarn of fibers, such as polyester fibers, polyethylene naphthalate fibers, aramid fibers, and vinylon fibers. The cord 13 has undergone an adhesion treatment to be adhesive to the adhesive rubber layer 12 of the belt body 10.

The reinforcing fabric 14 is comprised of a woven, knitted, or unwoven fabric made of nylon fibers, polyester fibers, aramid fibers, or cotton, for example. The reinforcing fabric 14 has undergone an adhesion treatment to be adhesive to the adhesive rubber layer 12 of the belt body 10.

(First Production Method)

A first production method of the V-ribbed belt B according to this embodiment will be described with reference to FIGS. 2 to 9.

The first production method includes a component preparation step, a shaping step, a crosslinking step, and a finishing step.

<Component Preparation Step>

In the component preparation step, a surface rubber sheet 112' to constitute the surface rubber layer 112, a core rubber sheet 111' to constitute the core rubber layer 111, an adhesive rubber sheet 12' to constitute the adhesive rubber layer 12, a cord 13', and a reinforcing fabric 14' are produced.

—Surface Rubber Sheet 112'—

A rubber component and compound ingredients are kneaded together by using a kneading machine such as kneader or a Banbury mixer to obtain an uncrosslinked rubber composition. The uncrosslinked rubber composition is molded by calender molding or the like, into a sheet, i.e., the surface rubber sheet 112'. Powder or short fibers may be previously attached to a surface, of the surface rubber sheet 112', which is to constitute a surface of the belt.

—Core Rubber Sheet 111'—

A rubber component and compound ingredients are kneaded together by using a kneading machine such as a kneader or a Banbury mixer to obtain an uncrosslinked rubber composition. The uncrosslinked rubber composition is molded by calender molding or the like, into a thick uncrosslinked rubber sheet 111". The core rubber sheet 111' is then prepared from the uncrosslinked rubber sheet 111".

The core rubber sheet 111' has, on one surface, a plurality of core rubber layer-forming portions 111a' which are each comprised of a linearly-extending ridge and which extend parallel to, and adjacent to, one another. The plurality of core rubber layer-forming portions 111a' has the same shape. Each core rubber layer-forming portion 111a' has a width decreasing toward its distal end. Specifically, each core rubber layer-forming portion 111a' is shaped to have a cross section in an isosceles trapezoidal shape.

Figure 3A:
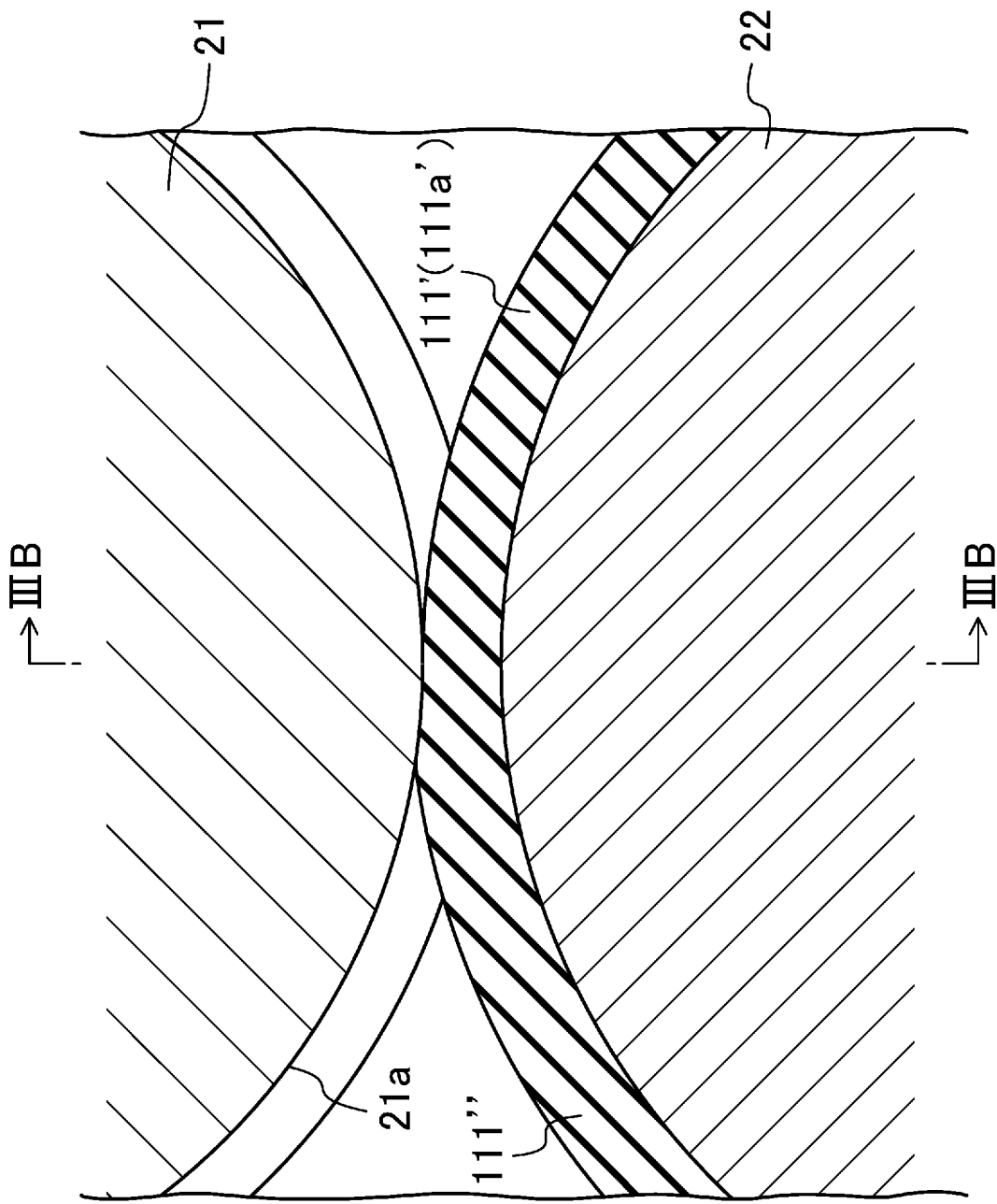
FIG. 3A shows how a core rubber sheet is produced in a component preparation step of the first production method.
Figure 3B:
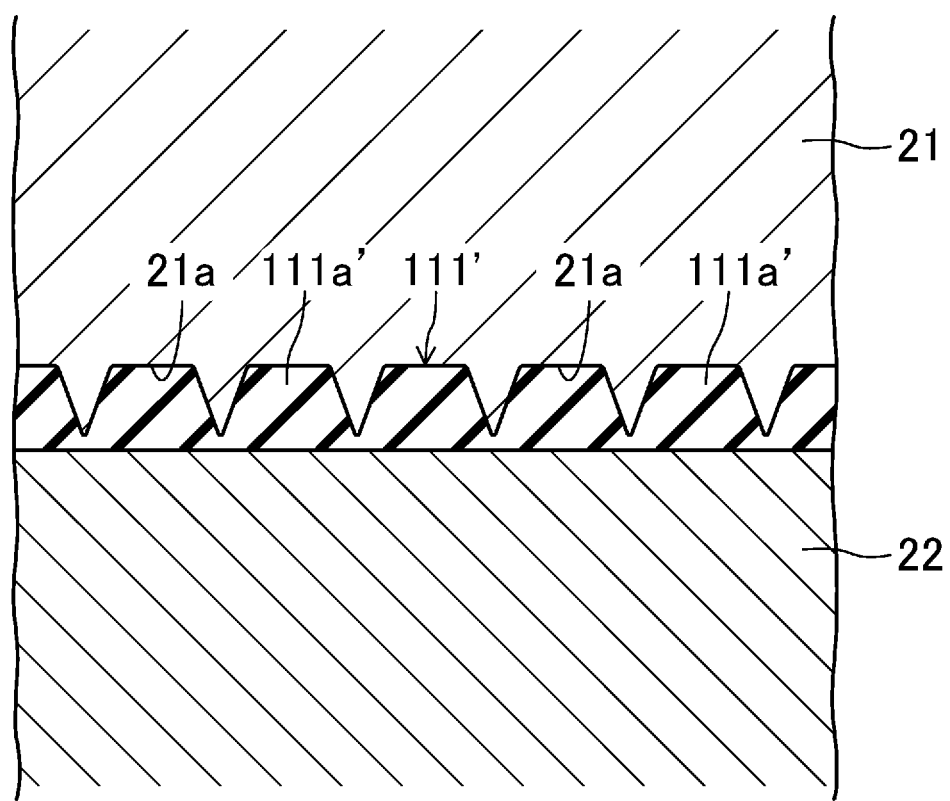
FIG. 3B is a cross-sectional view taken along line IIIB-IIIB of FIG. 3A.

The core rubber sheet 111' can be prepared in the following manner. As shown in FIGS. 3A and 3B, the uncrosslinked rubber sheet 111" is passed between a flat roll 22 and a core rubber-shaping roll 21 having trapezoidal grooves 21a that have a shape corresponding to the shape of the core rubber layer-forming portions 111a' of the core rubber sheet 111', extend in the circumferential direction, and are arranged adjacent to one another in the axial direction of the core rubber-shaping roll 21. In this manner, the trapezoidal grooves 21a on the outer peripheral surface of the core rubber-shaping roll 21 are pressed onto one of the surfaces of the uncrosslinked rubber sheet 111", thereby forming the core rubber layer-forming portions 111a'. The uncrosslinked rubber sheet 111" may be heated to increase the plasticity thereof. The core rubber sheet 111' can also be prepared by press molding or extrusion molding.

—Adhesive Rubber Sheet 12'—

A rubber component and compound ingredients are kneaded together by using a kneading machine such as kneader or a Banbury mixer to obtain an uncrosslinked rubber composition. The uncrosslinked rubber composition is molded by calender molding or the like, into a sheet, i.e., the adhesive rubber sheet 12'.

—Cord 13'—

A twisted yarn to form a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

—Reinforcing Fabric 14'—

A woven fabric or a fabric of any other type which is to serve as a reinforcing fabric 14' undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric which will face the belt body 10 and dried. The fabric may undergo, prior to these adhesion treatments, a base treatment in which the fabric is soaked in an epoxy resin solution or an isocyanate resin solution and heated. In the case where a stretch rubber layer is provided instead of the reinforcing fabric 14', a stretch rubber sheet to constitute the stretch rubber layer is prepared in a manner similar to that for the adhesive rubber sheet 12'.

<Shaping Step>

Figure 4A:
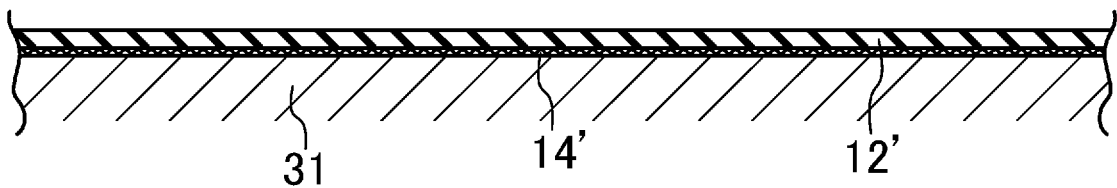
FIG. 4A is a first drawing showing a shaping step of the first production method.

In the shaping step, first, a shaping mandrel 31 having a cylindrical shape is rotatably supported on a shaft of a shaping machine (not shown) such that the axis of the shaping mandrel 31 extends horizontally. As shown in FIG. 4A, the reinforcing fabric 14' is wrapped around the shaping mandrel 31, and then, the adhesive rubber sheet 12' is wrapped around the reinforcing fabric 14'. The shaping mandrel 31 is chosen so as to correspond to the length of the V-ribbed belt B to be produced. In this step, the adhesive rubber sheet 12' is stacked on the reinforcing fabric 14'. Each of the reinforcing fabric 14' and the adhesive rubber sheet 12' is cut with ultrasound, a cutter, scissors, or the like, and its ends are lap jointed together. A reinforcing fabric 14' having a predetermined length may be formed into a cylindrical shape with its both ends joined together, and this cylindrical reinforcing fabric 14' may be fitted over the shaping mandrel 31. Alternatively, a reinforcing fabric 14' and an adhesive rubber sheet 12' may be stacked on and integrated with each other into a layered structure, and then, this layered structure may be wrapped around the shaping mandrel 31. Alternatively, the layered structure having a predetermined length may be formed into a cylindrical shape through joining of its both ends such that the adhesive rubber sheet 12' faces outside, and the resultant cylindrical structure may be fitted over the shaping mandrel 31. In the case of providing a stretch rubber layer, the stretch rubber sheet is used instead of the reinforcing fabric 14', and the shaping step is carried out in a similar manner.

Figure 4B:
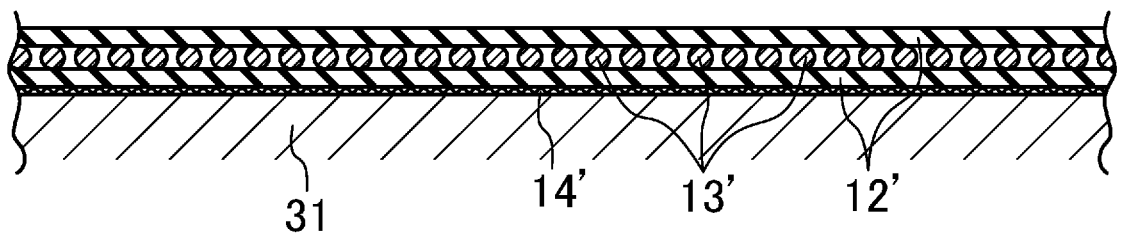
FIG. 4B is a second drawing showing the shaping step of the first production method.

Subsequently, as shown in FIG. 4B, the cord 13' is helically wound around the adhesive rubber sheet 12'. Another adhesive rubber sheet 12' is then wrapped over the wound cord 13'. At this time, a layer of the cord 13' is stacked on the adhesive rubber sheet 12', and the other adhesive rubber sheet 12' is stacked on the layer of the cord 13'. The adhesive rubber sheet 12' is cut with ultrasound, a cutter, scissors, or the like, and its ends are lap jointed together.

Figure 4C:
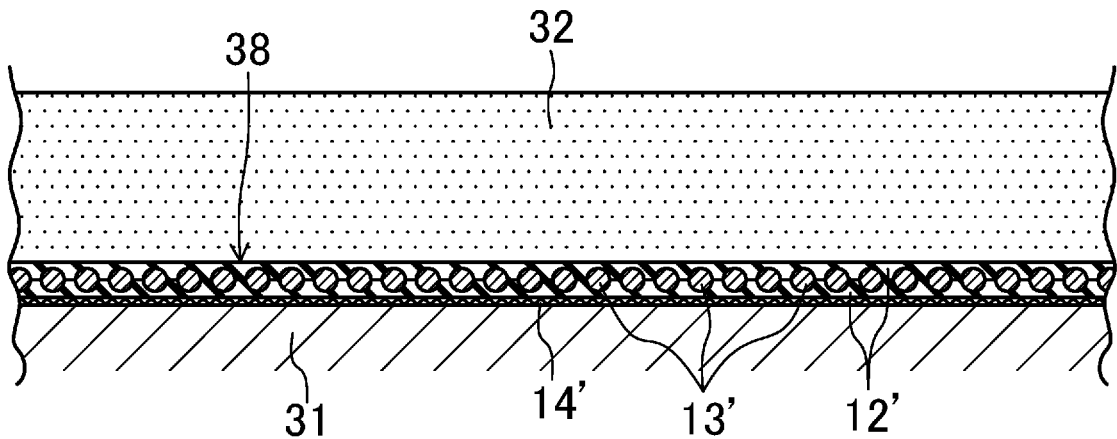
FIG. 4C is a third drawing showing the shaping step of the first production method.

Next, as shown in FIG. 4C, the entire periphery of the adhesive rubber sheet 12' is pressed with a roller 32. At this time, the rubber flows and enters between turns of the cord 13', and the cord 13' is embedded between the pair of adhesive rubber sheets 12' so as to be fixed in position. As a result, these components are all integrated into a cylindrical tensile member 38. This operation may be carried out simultaneously with wrapping the adhesive rubber sheet 12' around the layer of the cord 13'.

Figure 4D:
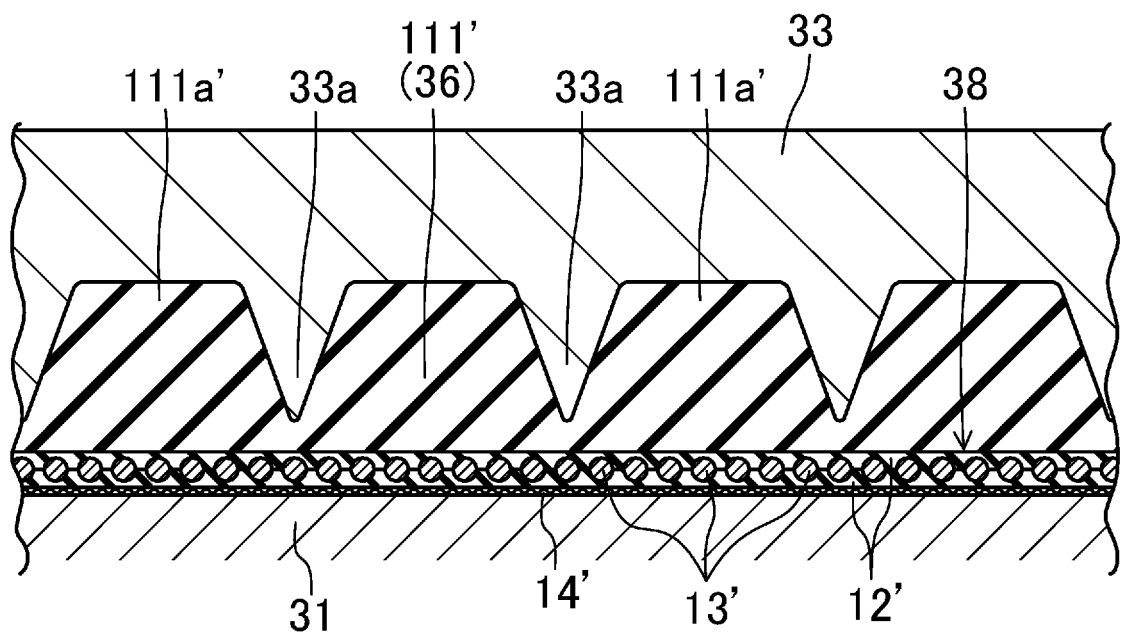
FIG. 4D is a fourth drawing showing the shaping step of the first production method.

Next, as shown in FIG. 4D, the core rubber sheet 111' is wrapped around the adhesive rubber sheet 12' of the tensile member 38 such that the core rubber layer-forming portions 111a' face outside and extend in the circumferential direction. At this time, a first comb-shaped guide 33 having a shape corresponding to the core rubber layer-forming portions 111a' of the core rubber sheet 111' is set outside the shaping mandrel 31 such that the guide 33 extends in the axial direction and comb teeth 33a of the guide 33 face the shaping mandrel 31. Each of the core rubber layer-forming portions 111a' of the core rubber sheet 111' is guided between an associated pair of the comb teeth 33a, and the core rubber sheet 111' is wrapped around, and stacked on, the adhesive rubber sheet 12' with the core rubber layer-forming portions 111a' extending in the circumferential direction with precision. The core rubber sheet 111' is cut with ultrasound, a cutter, scissors, or the like, and its ends are butt jointed. To increase the joint strength, the butt joint is preferably achieved by abutting surfaces, of the core rubber sheet 111', which are oblique with respect to the thickness direction of the core rubber sheet 111'. A core rubber sheet 111' having a predetermined length may be formed into a cylindrical shape with its both ends joined together such that the core rubber layer-forming portions 111a' face outside, and this cylindrically-shaped core rubber sheet 111' may be fitted over the adhesive rubber sheet 12'. The cylindrically-shaped core rubber sheet 111' constitutes a shaped structure 36, which has a cylindrical shape, is made of the uncrosslinked rubber composition, and has, on its outer peripheral surface, the core rubber layer-forming portions 111a'. The core rubber layer-forming portions 111a' are comprised of the plurality of ridges that extend in the circumferential direction and are arranged adjacent to one another in the axial direction.

Figure 4E:
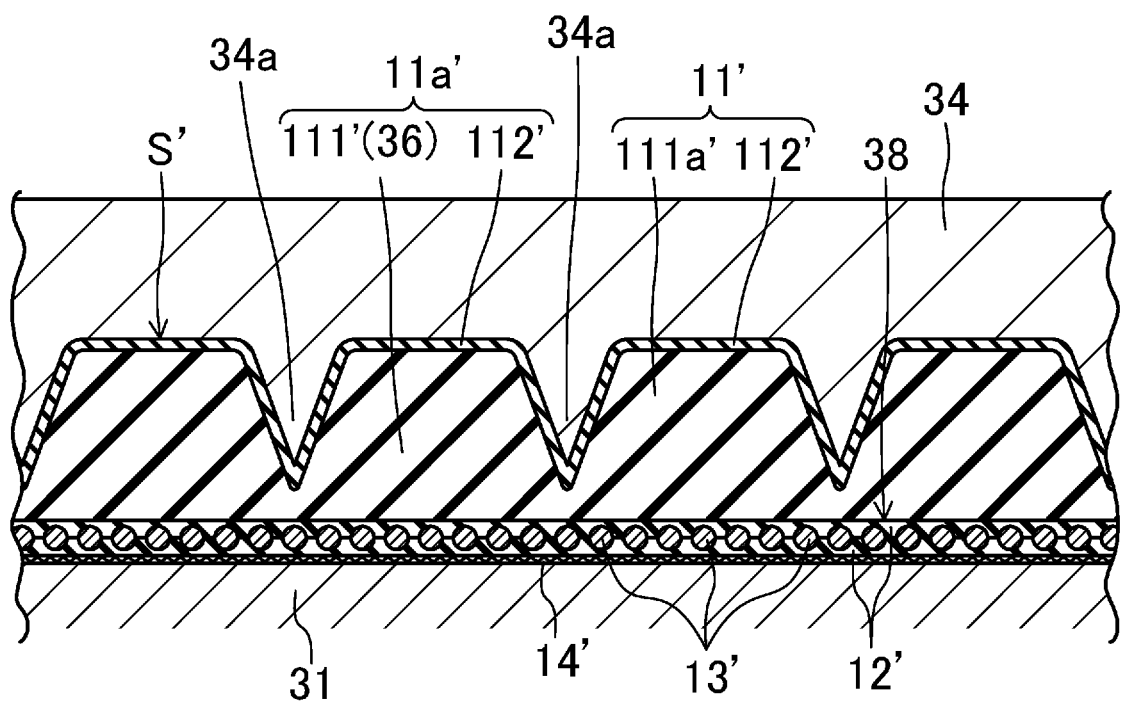
FIG. 4E is a fifth drawing showing the shaping step of the first production method.

Then, as shown in FIG. 4E, the surface rubber sheet 112' is wrapped around the core rubber sheet 111'. In this process, instead of the first guide 33, a second comb-shaped guide 34 having a shape which leaves a gap corresponding to the thickness of the surface rubber layer 112 between itself and the core rubber sheet 111' is set such that the second guide 34 extends in the axial direction and such that comb teeth 34a of the second guide 34 face the shaping mandrel 31. Thus, the surface rubber sheet 112' is forced into the gap between the core rubber sheet 111' and the second guide 34, and wraps around and covers the surface of the core rubber sheet 111' to be stacked on the core rubber sheet 111'.

Figure 4F:
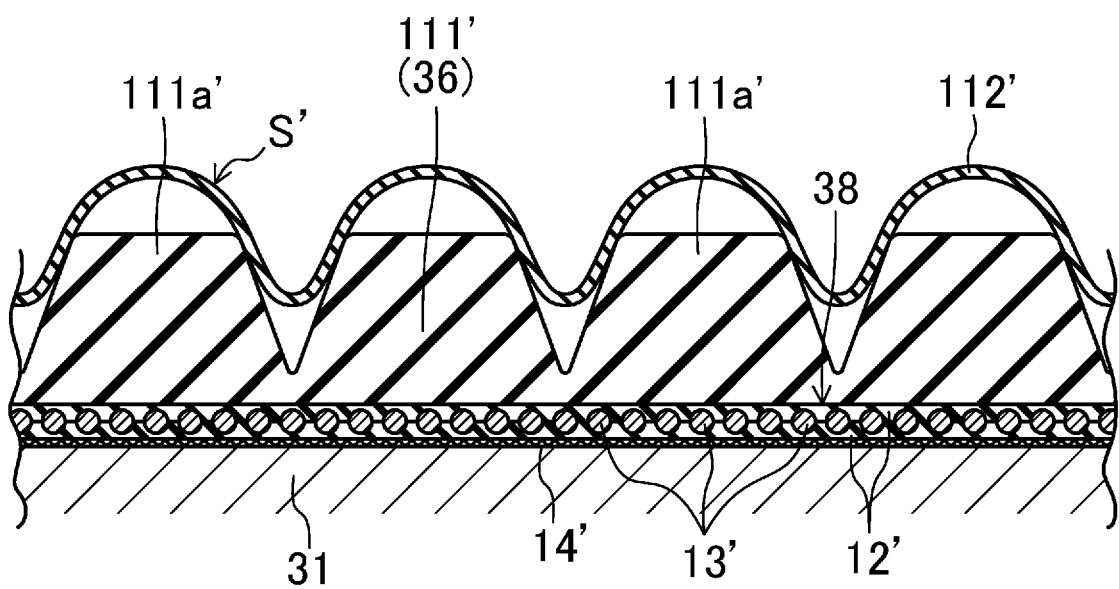
FIG. 4F is a sixth drawing showing the shaping step of the first production method.

Covering the surface of the core rubber sheet 111' with the surface rubber sheet 112' in advance in this manner can reduce stretch of the surface rubber sheet 112' to a small amount, enabling production of the V-ribbed belt B including the surface rubber layer 112 having a substantially uniform thickness. In order to reduce stretch of the surface rubber sheet 112' to a small amount and achieve a uniform thickness of the surface rubber layer 112, it is also preferable that: the surface rubber sheet 112' is subjected to a pleating process so that the cross section in the width direction is corrugated to have the same pitches as those of the core rubber layer-forming portions 111a' as shown in FIG. 4F, prior to covering the surface of the core rubber sheet 111' with the surface rubber sheet 112' using the second guide 34; the corrugated surface rubber sheet 112' is then set such that its portions protruding toward the core rubber sheet 111' (the core rubber layer-forming portions 111a') are positioned at grooves between the core rubber layer-forming portions 111a' of the core rubber sheet 111'; and the protruding portions are halfway fitted in the grooves so that the surface rubber sheet 112' loosely fits the core rubber sheet 111'. Such a pleating process may include continuously passing the surface rubber sheet 112' between a pair of plate-like or rolled members configured to pleat the surface rubber sheet 112' which originally has a flat shape. In this process, the surface rubber sheet 112' is preferably pleated such that pitches of the pleated shape gradually decrease in a length direction.

The surface rubber sheet 112' may be closely fitted to the core rubber sheet 111', or may simply lie along the surface of the core rubber sheet 111' instead of being closely fitted. Ends of the surface rubber sheet 112' are butt jointed, lap jointed, or jointed, on an underlying layer, with a space between the ends. Alternatively, the surface rubber sheet 112' may be layered on the core rubber sheet 111' in the following manner: ends of a surface rubber sheet 112' having a predetermined length are joined together to form a cylindrical shape; the thus obtained cylindrical surface rubber sheet 112' is fitted over the core rubber sheet 111'; and the entire peripheral surface of the core rubber sheet 111' is covered with the cylindrical surface rubber sheet 112' using the second guide 34.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 111', and the surface rubber sheet 112' that are sequentially stacked toward the outside. The uncrosslinked slab S' includes the core rubber sheet 111' formed into a cylindrical shape, i.e., the shaped structure 36 which has a cylindrical shape. The shaped structure 36 is made of the uncrosslinked rubber composition and has, on its outer peripheral surface, the core rubber layer-forming portions 111a' that are comprised of the plurality of ridges extending in the circumferential direction and that are arranged adjacent to one another in the axial direction. In the uncrosslinked slab S', the core rubber sheet 111' and the surface rubber sheet 112' covering the core rubber sheet 111' together form the compressed rubber sheet 11a'. Further, the core rubber layer-forming portions 111a' and the surface rubber sheet 112' made of the uncrosslinked rubber composition and covering the core rubber layer-forming portions 111a' together form compressed rubber layer-forming portions 11'. The number of the compressed rubber layer-forming portions 11' included in the uncrosslinked slab S' is 20 to 100, for example.

<Crosslinking Step>

Figure 5A:
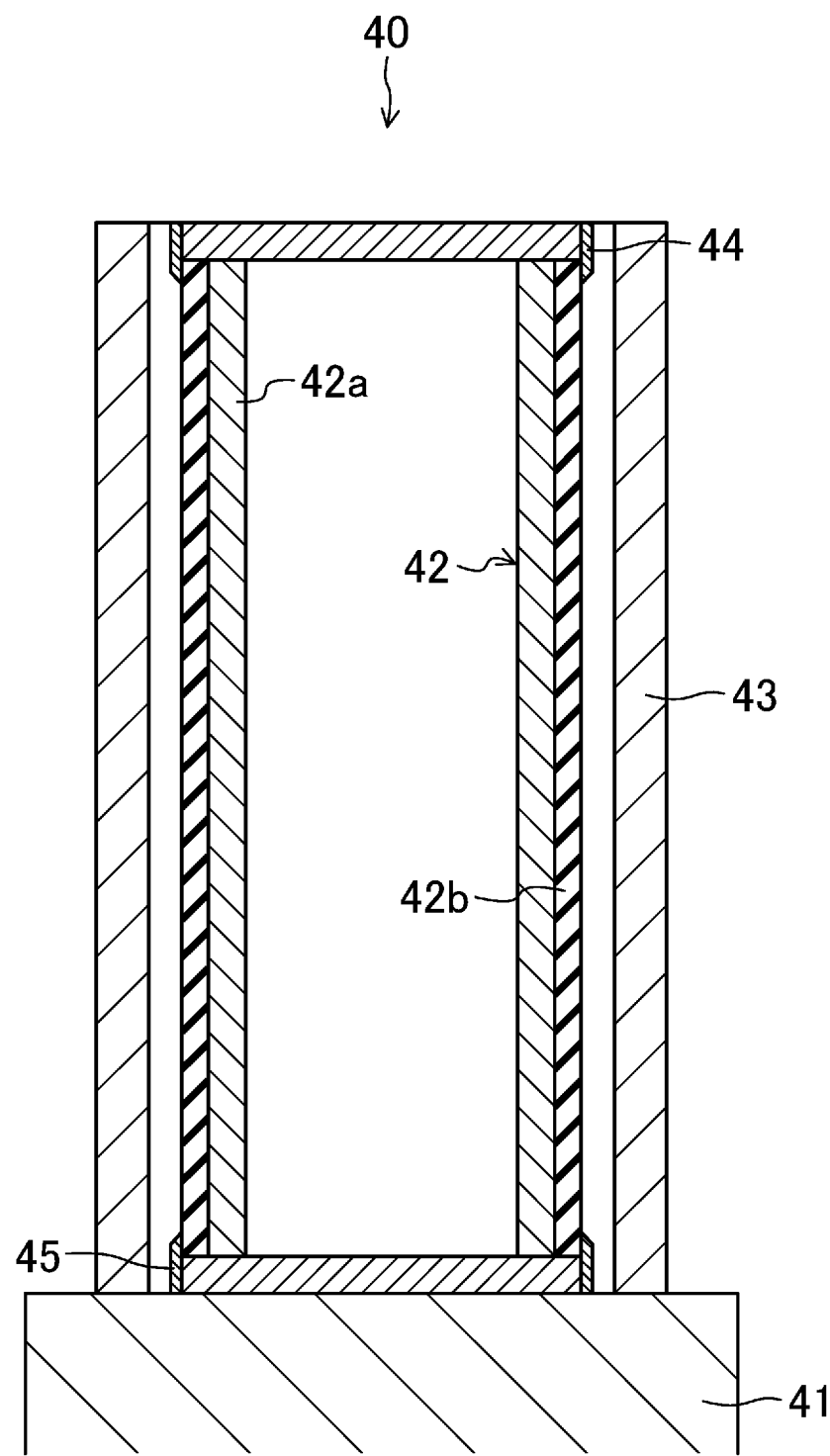
FIG. 5A is a cross-sectional view of a crosslinking apparatus.
Figure 5B:
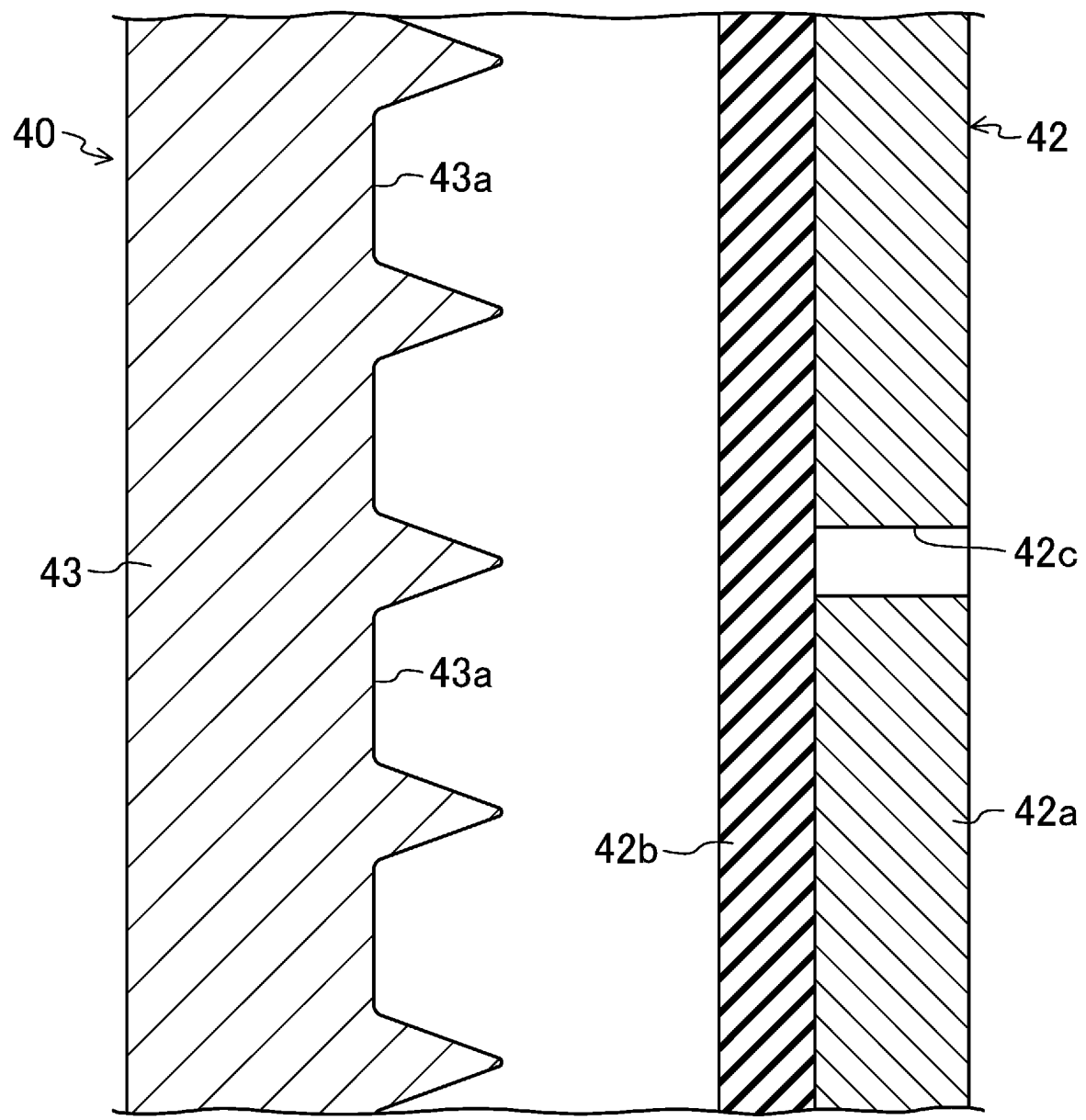
FIG. 5B shows, on an enlarged scale, a cross section of a portion of the crosslinking apparatus.

FIGS. 5A and 5B illustrate a crosslinking apparatus 40 for use in a crosslinking step.

The crosslinking apparatus 40 includes a base 41, a columnar expansion drum 42 standing on the base 41, a cylindrical mold 43 (belt mold) provided outside the expansion drum 42.

The expansion drum 42 includes a drum body 42a having a hollow columnar shape, and a cylindrical expansion sleeve 42b made of rubber and externally fitted over the outer periphery of the drum body 42a. The drum body 42a has, in its peripheral wall, a large number of air-passage holes 42c communicating with the inside. A space between the expansion sleeve 42b and the drum body 42a is sealed by the fixing rings 44 and 45 at both ends of the expansion sleeve 42b. The crosslinking apparatus 40 includes a pressurizing means (not shown) for applying a pressure by introducing high-pressure air into the drum body 42a. The high-pressure air introduced into the drum body 42a by the pressurizing means passes through the air-passage holes 42d to enter the space between the drum body 42a and the expansion sleeve 42b, and inflates the expansion sleeve 42b radially outward.

The cylindrical mold 43 is attachable to, and detachable from, the base 41. The cylindrical mold 43 is attached to the base 41 such that the cylindrical mold 43 and the expansion drum 42 are arranged concentrically with each other with a space interposed therebetween. The cylindrical mold 43 has, on its inner peripheral surface, a plurality of compressed rubber layer-shaping grooves 43a which extend in the circumferential direction and are arranged adjacent to one another in the axial direction (the groove width direction). Each compressed rubber layer-shaping groove 43a tapers toward its groove bottom. Specifically, each compressed rubber layer-shaping groove 43a has the same isosceles trapezoidal cross section as the core rubber layer 111 of the V-ribbed belt B to be produced. The crosslinking apparatus 40 includes a heating means and a cooling means (both are not shown) for the cylindrical mold 43, so that the temperature of the cylindrical mold 43 can be controlled by these heating and cooling means.

First, the uncrosslinked slab S' is removed from the shaping mandrel 31, and then, placed in the cylindrical mold 43, of the crosslinking apparatus 40, which has been previously detached from the base 41. More specifically, the uncrosslinked slab S' is set in the cylindrical mold 43 such that each of the plurality of compressed rubber layer-forming portions 11' of the uncrosslinked slab S' (the core rubber layer-forming portions 111a' covered with the surface rubber sheet 112') is fitted in an associated one of the compressed rubber layer-shaping grooves 43a of the cylindrical mold 43. Fitting the compressed rubber layer-forming portions 11' in the compressed rubber layer-shaping grooves 43a in advance reduces stretch of the rubber, thereby enabling production of a V-ribbed belt B having a stable structure. At this time, the shaped structure 36 and the surface rubber sheet 112' are set in the cylindrical mold 43 such that the shaped structure 36 and the surface rubber sheet 112' are positioned respectively inside and outside with respect to each other. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the uncrosslinked slab S' in advance.

Subsequently, as shown FIG. 6A, the cylindrical mold 43 within which the uncrosslinked slab S' has been set is attached to the base 41 such that the cylindrical mold 43 covers the expansion drum 42. This means that the tensile member 38, which is comprised of the uncrosslinked rubber composition shaped into a cylindrical shape and having the cord 13' embedded therein so as to form a helical pattern with pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other.

Figure 6A:
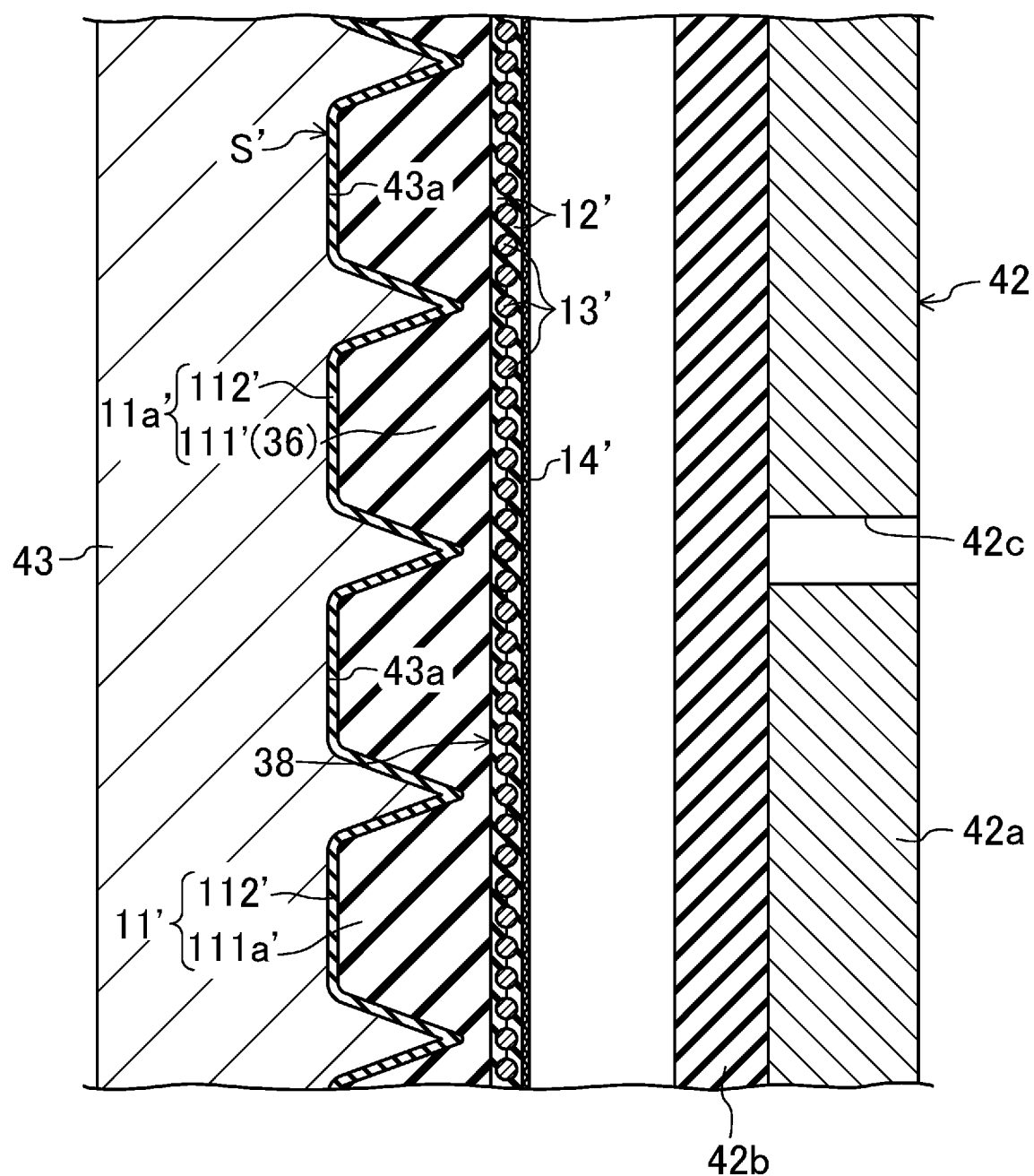
FIG. 6A is a first drawing showing a crosslinking step of the first production method.
Figure 6B:
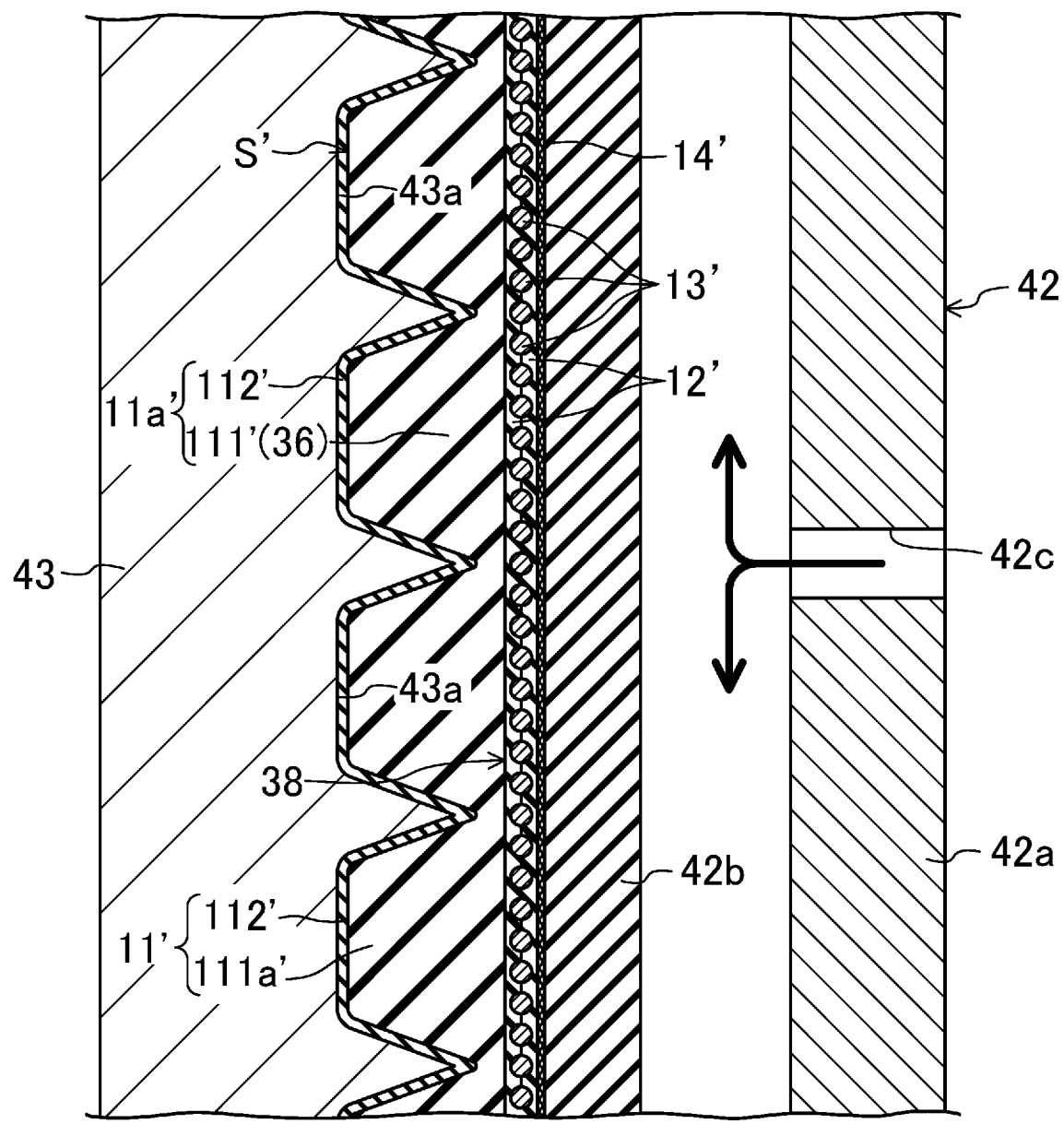
FIG. 6B is a second drawing showing the crosslinking step of the first production method.

As shown in FIG. 6B, the pressurizing means introduces high-pressure air into the drum body 42a of the expansion drum 42 so as to expand the expansion sleeve 42b radially outwardly. After a predetermined pressure is reached, heating is begun. This state is then maintained for a predetermined period of time. As a result, the entire surface rubber sheet 112' is heated uniformly. At this moment, while having each of the compressed rubber layer-forming portions 11' fitted in the associated one of the compressed rubber layer-shaping grooves 43a of the cylindrical mold 43, the uncrosslinked slab S' is heated by the cylindrical mold 43 and pressed toward the cylindrical mold 43 by the expansion sleeve 42b that comes into contact with the slab S'. That is, the pressing of the shaped structure 36 toward the cylindrical mold 43 is carried out by expanding the expansion sleeve 42b, disposed radially inward of the shaped structure 36, and pressing the shaped structure 36 from radially inside. Further, the rubber components contained in the surface rubber sheet 112', the core rubber sheet 111', and the adhesive rubber sheets 12' that are included in the uncrosslinked slab S' are crosslinked to be integrated with one another. As a result, a continuous member of belt bodies 10 for a plurality of V-ribbed belts B is produced, wherein each of the belt bodies 10 includes the compressed rubber layer 11 comprised of the surface rubber layer 112 and the core rubber layer 111, and the adhesive rubber layer 12. At the same time, the rubber components adhere to, and are combined with, the cord 13' and the reinforcing fabric 14'. A cylindrical belt slab S is thus molded eventually. For example, the heating is carried out at a temperature of 100° C. to 180° C., the pressurization is carried out at a pressure of 0.5 MPa to 2.0 MPa, and the process continues for 10 minutes to 60 minutes.

Figure 7:
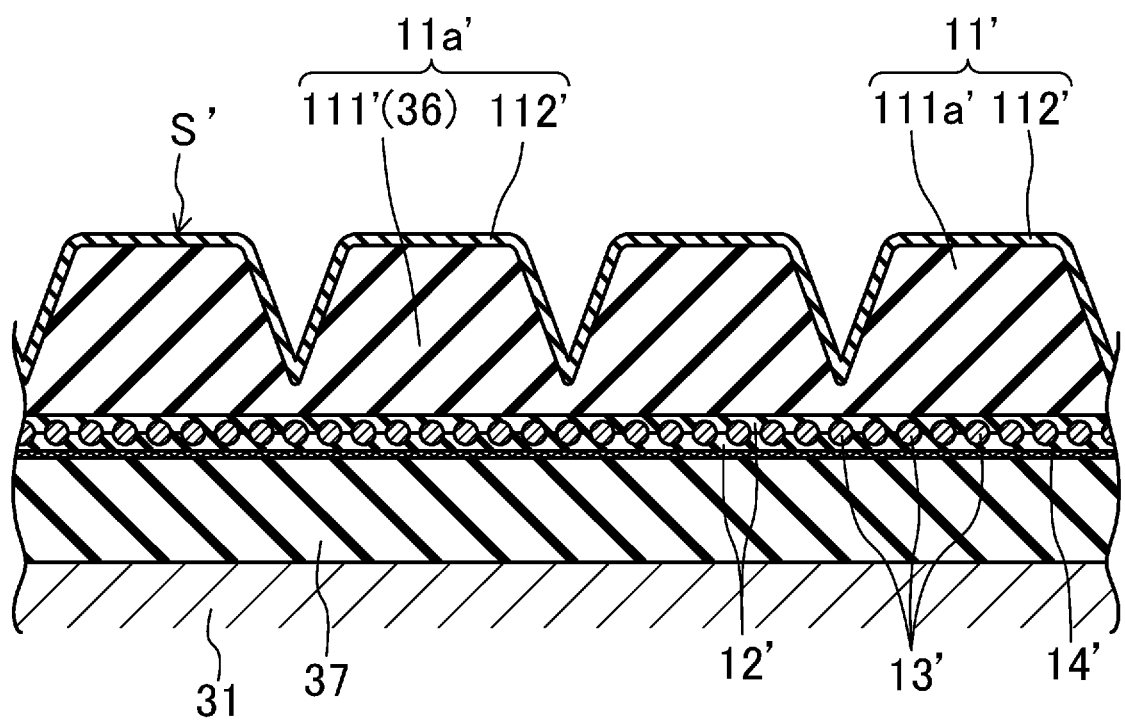
FIG. 7 shows a shaping step of a variation of the first production method.
Figure 8:
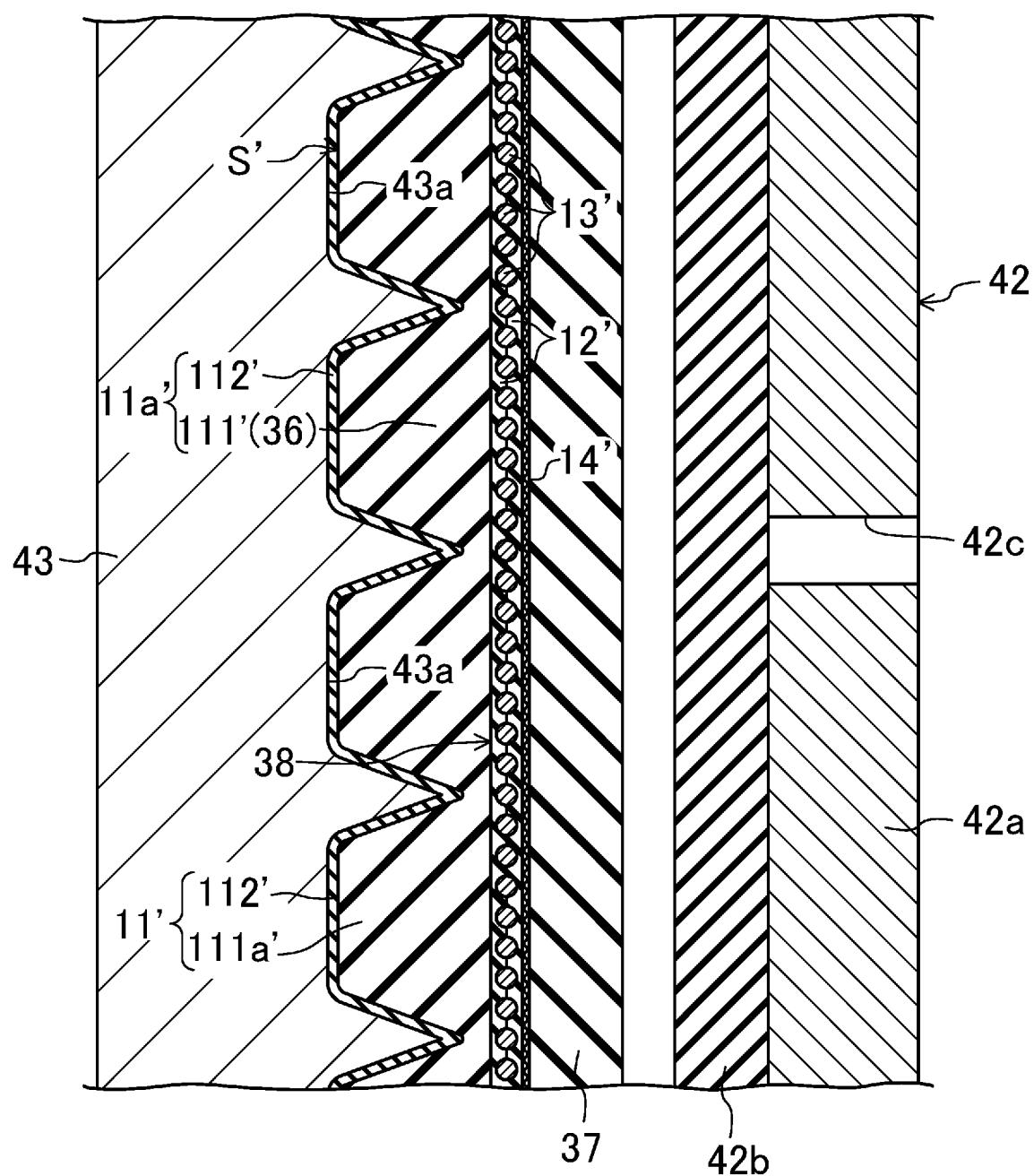
FIG. 8 shows a crosslinking step of a variation of the first production method.

The shaping step may be performed such that, as shown in FIG. 7, a rubber-made shaping sleeve 37 is fitted over the shaping mandrel 31 to form an uncrosslinked slab S' on the shaping sleeve 37. In the crosslinking step, the uncrosslinked slab S' and the shaping sleeve 37 are together removed from the shaping mandrel 31. The removed slab S' and sleeve 37 are then set in the cylindrical mold 43, as shown in FIG. 8. In other words, the shaping sleeve 37 may be interposed between the expansion drum 42 and the uncrosslinked slab S'.

<Finishing Step>

In the finishing step, the pressure inside the drum body 42a applied by the pressurizing means is released. After the cylindrical mold 43 is cooled by the cooling means, the cylindrical mold 43 is detached from the base 41, and the belt slab S that has been molded in the cylindrical mold 43 is removed from the cylindrical mold 43.

Figure 9:
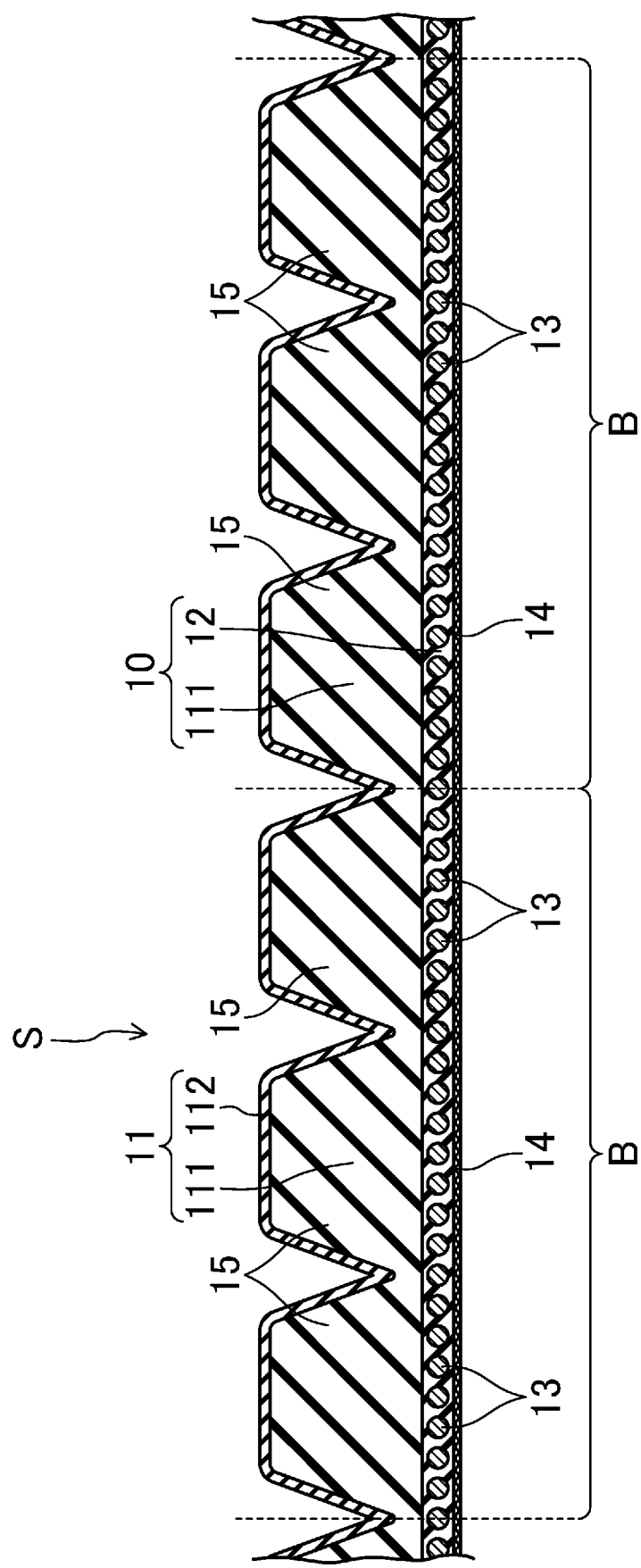
FIG. 9 shows a finishing step of the first production method.

As shown in FIG. 9, the belt slab S that has been removed from the cylindrical mold 43 is cut into ring-shaped pieces each having two or more of compressed rubber layer-forming portions 11' (three compressed rubber layer-forming portions 11' in this embodiment). Each piece is turned inside out, thereby obtaining the V-ribbed belt B of this embodiment. If necessary, a surface treatment such as grinding may be provided to the outer peripheral surface of the belt slab S before being cut into the ring-shaped pieces, or the surface, of the V-ribbed belt B, adjacent to the compressed rubber layer 11 after the cutting into the ring-shaped pieces.

According to this method, a situation which is adverse to the performance of the belt, i.e., the situation where almost no surface rubber layer 112 is formed at bottom portions of ribs is substantially avoided. Hence, a situation where even a small amount of abrasion causes the inner rubber to be exposed and increases the coefficient of friction, and the belt generates a noise is substantially avoided, and the durability of the surface rubber layer 112 is ensured. Thus, this method enables production of an inexpensive V-ribbed belt which is unlikely to generate a noise and has a high wear resistance without having to use expensive short fibers.

(Second Production Method)

A second production method will be described below with reference to FIG. 10.

The second production method includes a shaping step in which a core rubber sheet 111' is cut so as to have a length corresponding to the length of a V-ribbed belt B to be produced, and both ends of the core rubber sheet 111' are cut with ultrasound, a cutter, scissors, or the like, and then butt jointed together such that the core rubber layer-forming portions 111a' face outside and extend in the circumferential direction. To increase the joint strength, the butt joint is preferably achieved by abutting surfaces, of the core rubber sheet 111', which are oblique with respect to the thickness direction of the core rubber sheet 111'. A shaped structure 36 which has a cylindrical shape is produced in this manner. The shaped structure 36 is made of the uncrosslinked rubber composition and has, on its outer peripheral surface, the plurality of core rubber layer-forming portions 111a' extending in the circumferential direction and arranged adjacent to one another in the axial direction.

Next, a surface rubber sheet 112' is wrapped around the shaped structure 36 such that the surface rubber sheet 112' covers, and is stacked on, the surface of the shaped structure 36. At this moment, each of the plurality of the core rubber layer-forming portions 111a' is covered with the surface rubber sheet 112'. The core rubber layer-forming portions 111a' covered with the surface rubber sheet 112' constitute compressed rubber layer-forming portions 11'. Covering the surface of the core rubber sheet 111' with the surface rubber sheet 112' in advance reduces stretch of the surface rubber sheet 112', enabling production of the V-ribbed belt B including a surface rubber layer 112 having a uniform thickness. The surface rubber sheet 112' may be closely fitted to the core rubber sheet 111' (the core rubber layer-forming portions 111a') like a single sheet, or may simply lie along the surface of the core rubber sheet 111' instead of being closely fitted. Ends of the surface rubber sheet 112' are butt jointed, lap jointed, or jointed, on an underlying layer, with a space between the ends. A surface rubber sheet 112' having a predetermined length may be formed into a cylindrical shape through joining of its both ends, and this cylindrical surface rubber sheet 112' may be fitted over the shaped structure 36 so as to cover the entire peripheral surface of the shaped structure 36.

Further, in a manner as in FIGS. 4A to 4C illustrating the first production method, a reinforcing fabric 14', an adhesive rubber sheet 12', a cord 13', and another adhesive rubber sheet 12' are stacked on a shaping mandrel 31 in the stated order. After that, the entire peripheral surface of the stacked structure is pressed with a roller 32 on the adhesive rubber sheet 12' to integrate the stacked structure and produce a cylindrical tensile member 38.

Figure 10:
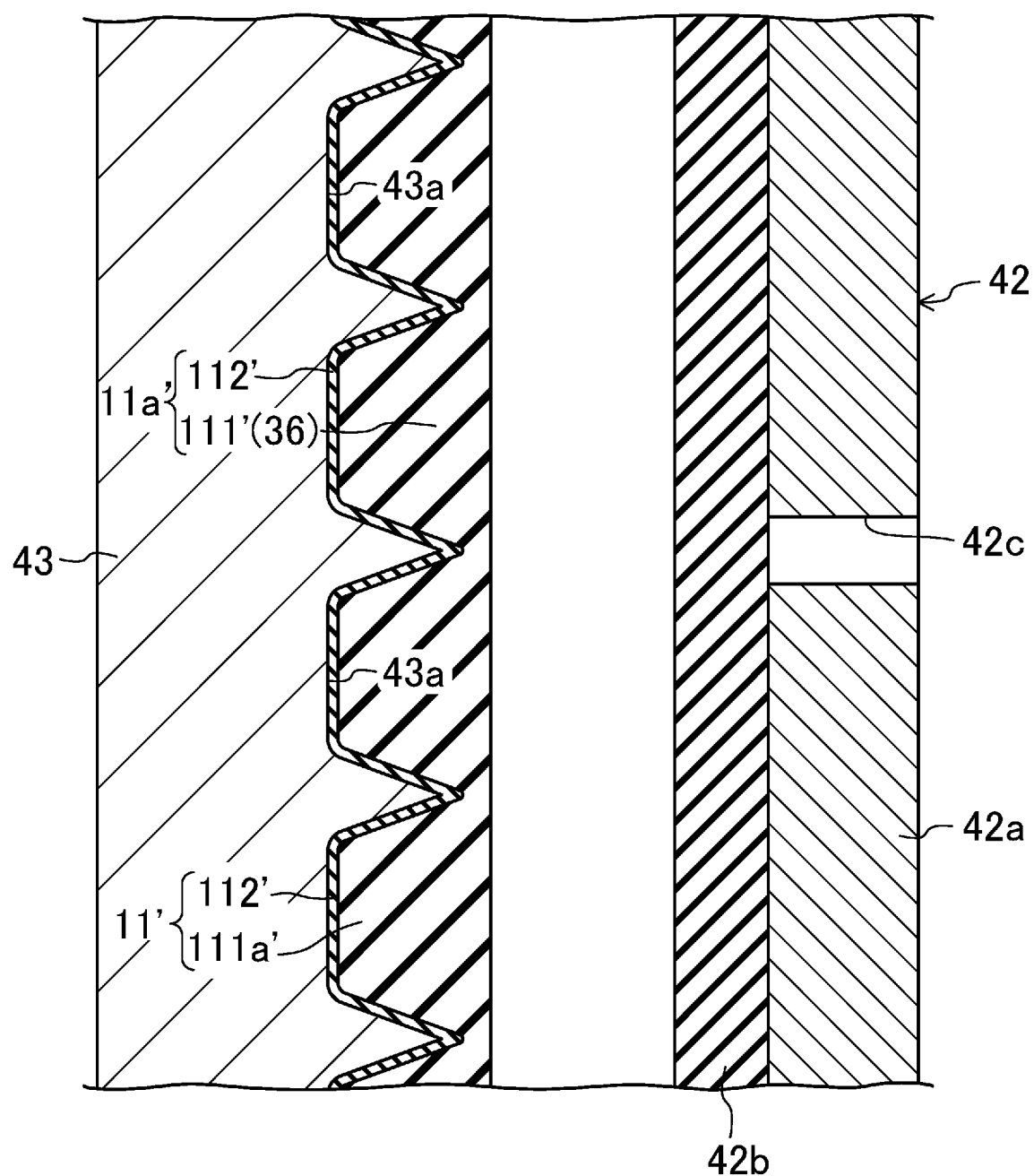
FIG. 10 shows a crosslinking step of a second production method.

As shown in FIG. 10, the shaped structure 36 covered with the surface rubber sheet 112' is placed in the cylindrical mold 43 in the crosslinking step. More specifically, the shaped structure 36 covered with the surface rubber sheet 112' is set in the cylindrical mold 43 such that each of the plurality of compressed rubber layer-forming portions 11' comprised of the core rubber layer-forming portions 111a' covered with the surface rubber sheet 112' is fitted in an associated one of the compressed rubber layer-shaping grooves 43a of the cylindrical mold 43. Fitting the compressed rubber layer-forming portions 11' in the compressed rubber layer-shaping grooves 43a in advance reduces stretch of the rubber, thereby enabling production of a V-ribbed belt B having a stable structure. At this time, the shaped structure 36 and the surface rubber sheet 112' are set in the cylindrical mold 43 such that the shaped structure 36 and the surface rubber sheet 112' are positioned respectively inside and outside with respect to each other. The cylindrical mold 43 is chosen to correspond to the length of the V-ribbed belt B to be produced. Note that short fibers, resin powder, or the like may be attached in advance to the inner peripheral surface of the cylindrical mold 43 and/or the outer peripheral surface of the surface rubber sheet 112' covering the shaped structure 36.

The tensile member 38 is removed from the shaping mandrel 31, and is then fitted in the shaped structure 36 set in the cylindrical mold 43, such that the outer peripheral surface of the tensile member 38 comes into contact with the inner peripheral surface of the shaped structure 36, that is, so as to be in a positional relationship as in FIG. 6A illustrating the first production method.

Then, the cylindrical mold 43 within which the shaped structure 36 covered with the surface rubber sheet 112' and the tensile member 38 have been set is attached to the base 41 such that the cylindrical mold 43 covers the expansion drum 42. This means that the tensile member 38, which is comprised of the uncrosslinked rubber composition shaped into a cylindrical shape and having the cord 13' embedded therein so as to form a helical pattern with pitches in the axial direction, is placed between the shaped structure 36 and the expansion sleeve 42*b* of the expansion drum 42. Before expansion of the expansion sleeve 42*b*, a gap is interposed between the tensile member 38 and the expansion sleeve 42*b*, and the shaped structure 36 and the tensile member 38 are in contact with each other.

Note that the shaped structure 36 covered with the surface rubber sheet 112' may be fitted over the tensile member 38 to produce the uncrosslinked slab S'. This uncrosslinked slab S' may be placed inside the cylindrical mold 43.

Alternatively, the shaped structure 36 covered with the surface rubber sheet 112' may be disposed inside the cylindrical mold 43, and the tensile member 38 may be disposed outside the expansion drum 42. In this case, a gap is formed between the shaped structure 36 covered with the surface rubber sheet 112' and set in the cylindrical mold 43, and the tensile member 38 set over the expansion drum 42. When the expansion sleeve 42*b* of the expansion drum 42 is expanded radially outward, the tensile member 38 expands radially outward and comes into contact with the shaped structure 36 covered with the surface rubber sheet 112'. The tensile member 38 and the shaped structure 36 covered with the surface rubber sheet 112' in this state are heated by the cylindrical mold 43, and are pressed toward the cylindrical mold 43 by the expansion sleeve 42*b*. A belt slab S is molded as a result. That is, the pressing of the shaped structure 36 toward the cylindrical mold 43 is carried out by expanding the expansion sleeve 42*b*, disposed radially inward of the shaped structure 36, and pressing the shaped structure 36 from radially inside.

The other features and advantages are the same as those of the first production method.

(Third Production Method)

Figure 11:
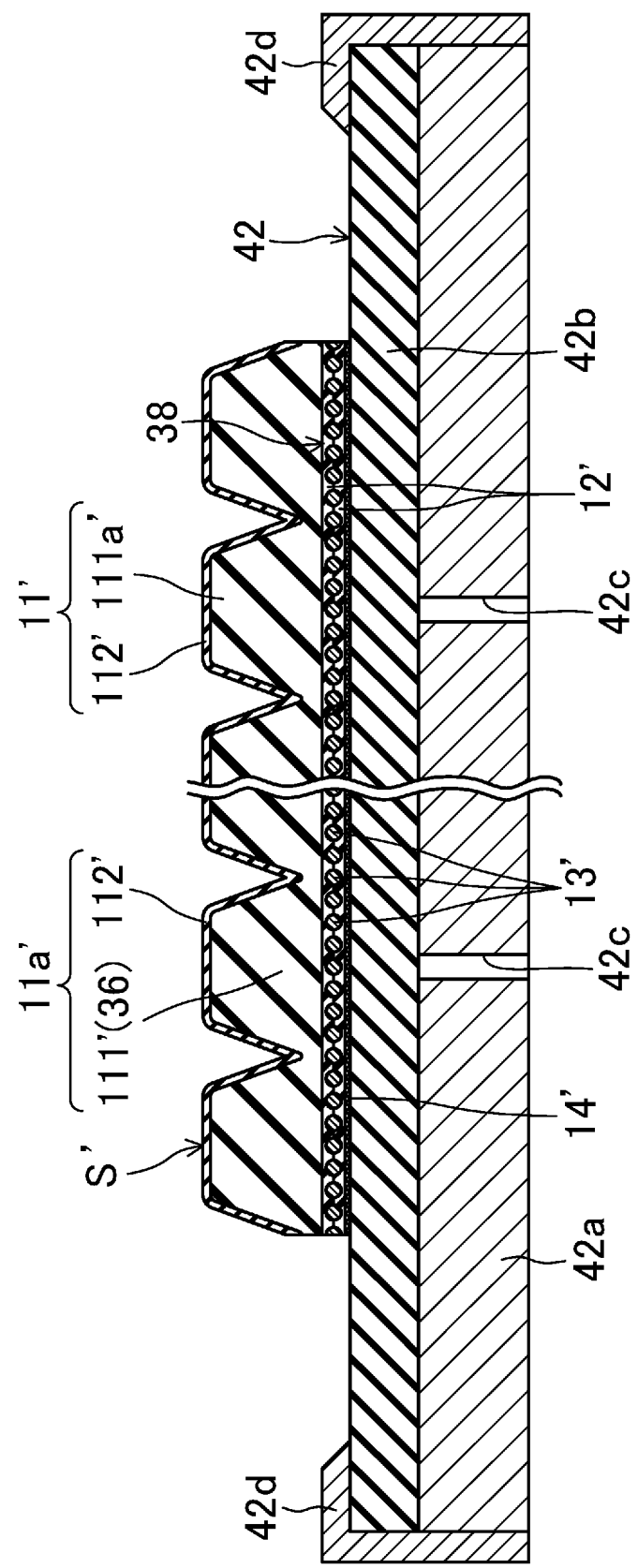
FIG. 11 shows a shaping step of a third production method.

A third production method will be described with reference to FIGS. 11, 12A and 12B.

According to the third production method, a crosslinking apparatus 40 including an expansion drum 42 that is attachable to, and detachable from, a base 41 is used. The expansion drum 42 serves also as a shaping mandrel. The expansion drum 42 includes a drum body 42*a* having a hollow columnar shape, and an expansion sleeve 42*b* made of rubber and externally fitted over the outer periphery of the drum body 42*a*. The expansion drum 42 has basically the same structure as that for use in the first production method. Fixing rings 42*d* fix both ends of the expansion sleeve 42*b* to the drum body 42*a* and seal a space between the expansion sleeve 42*b* and the drum body 42*a*.

In a shaping step, the expansion drum 42 is rotatably supported on a shaft of a shaping machine (not shown) such that the axis of the expansion drum 42 extends horizontally. As shown in FIG. 11, similarly to the first production method, a reinforcing fabric 14', an adhesive rubber sheet 12', a cord 13', another adhesive rubber sheet 12', a core rubber sheet 111', and a surface rubber sheet 112' are stacked on the expansion drum 42, thereby forming an uncrosslinked slab S'.

Figure 12A:
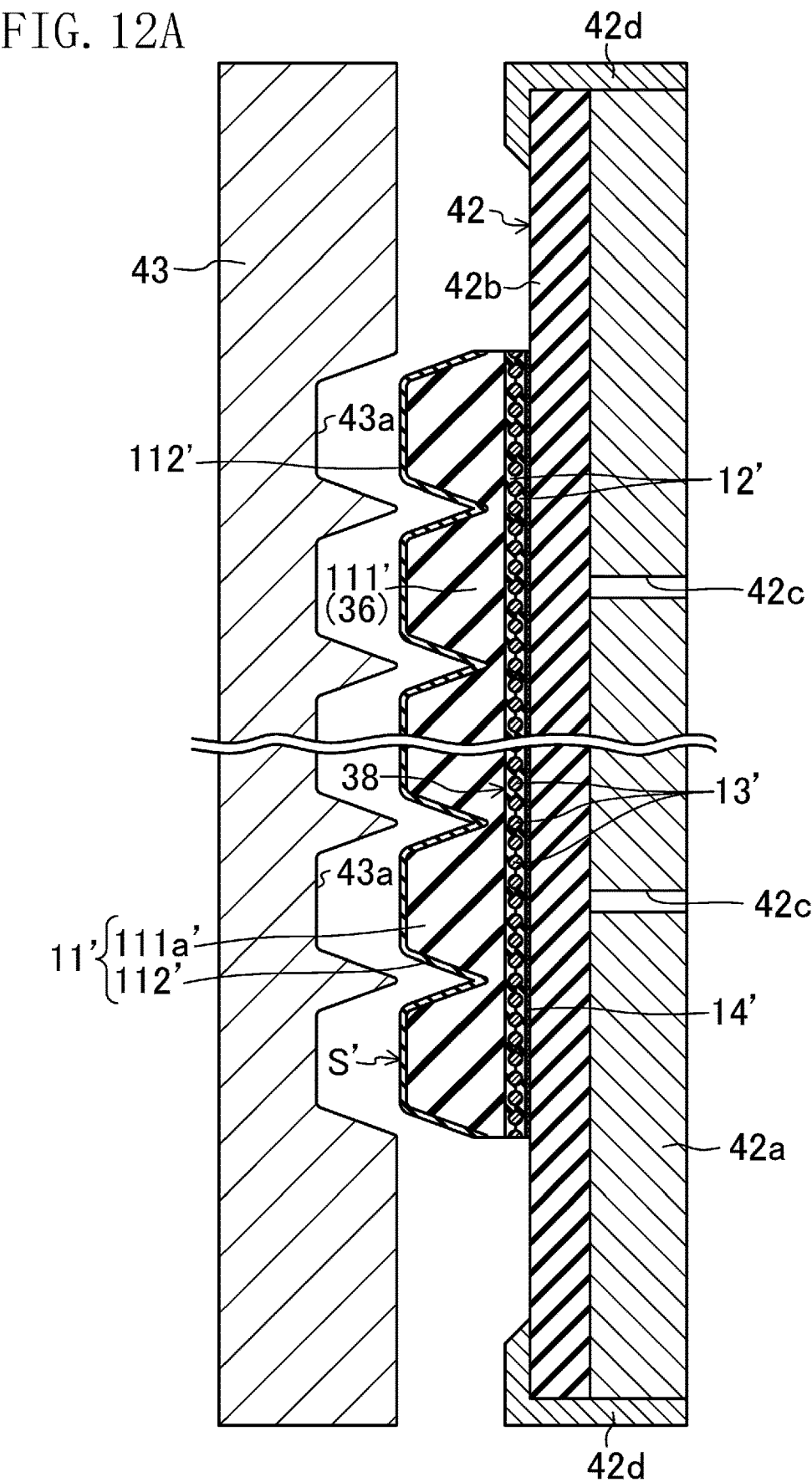
FIG. 12A is a first drawing showing a crosslinking step of the third production method.

In a crosslinking step, as shown FIG. 12A, the expansion sleeve 42*b* on which the uncrosslinked slab S' has been formed is detached from the shaping machine, and the expansion sleeve 42*b* is attached to the crosslinking apparatus 40 so as to stand on the base 41 of the crosslinking apparatus 40.

Next, the cylindrical mold 43 is attached to the base 41 such that the cylindrical mold 43 covers the expansion drum 42. At this time, the shaped structure 36 comprised of the cylindrically-shaped core rubber sheet 111' and the surface rubber sheet 112' that are included in the uncrosslinked slab S' are set in the cylindrical mold 43 such that the shaped structure 36 and the surface rubber sheet 112' are positioned respectively inside and outside with respect to each other. The cylindrical mold 43 is chosen to correspond to the length of the V-ribbed belt B to be produced and to have an inner diameter larger than the outer diameter of the uncrosslinked slab S' formed on the expansion drum 42. The uncrosslinked slab S' is set such that the distal end of each of the compressed rubber layer-forming portions 11' is positioned at an opening of an associated one of the compressed rubber layer-shaping grooves 43*a* of the cylindrical mold 43. This means that the tensile member 38, which is comprised of the uncrosslinked rubber composition shaped into a cylindrical shape and having the cord 13' embedded therein so as to form a helical pattern with pitches in the axial direction, is placed between the shaped structure 36 and the expansion sleeve 42*b* of the expansion drum 42. Before expansion of the expansion sleeve 42*b*, the tensile member 38 is formed on the expansion sleeve 42*b*, and the shaped structure 36 and the tensile member 38 are in contact with each other. Note that short fibers, resin powder, or the like may be attached to the inner peripheral surface of the cylindrical mold 43 and/or the outer peripheral surface of the uncrosslinked slab S' in advance.

Figure 12B:
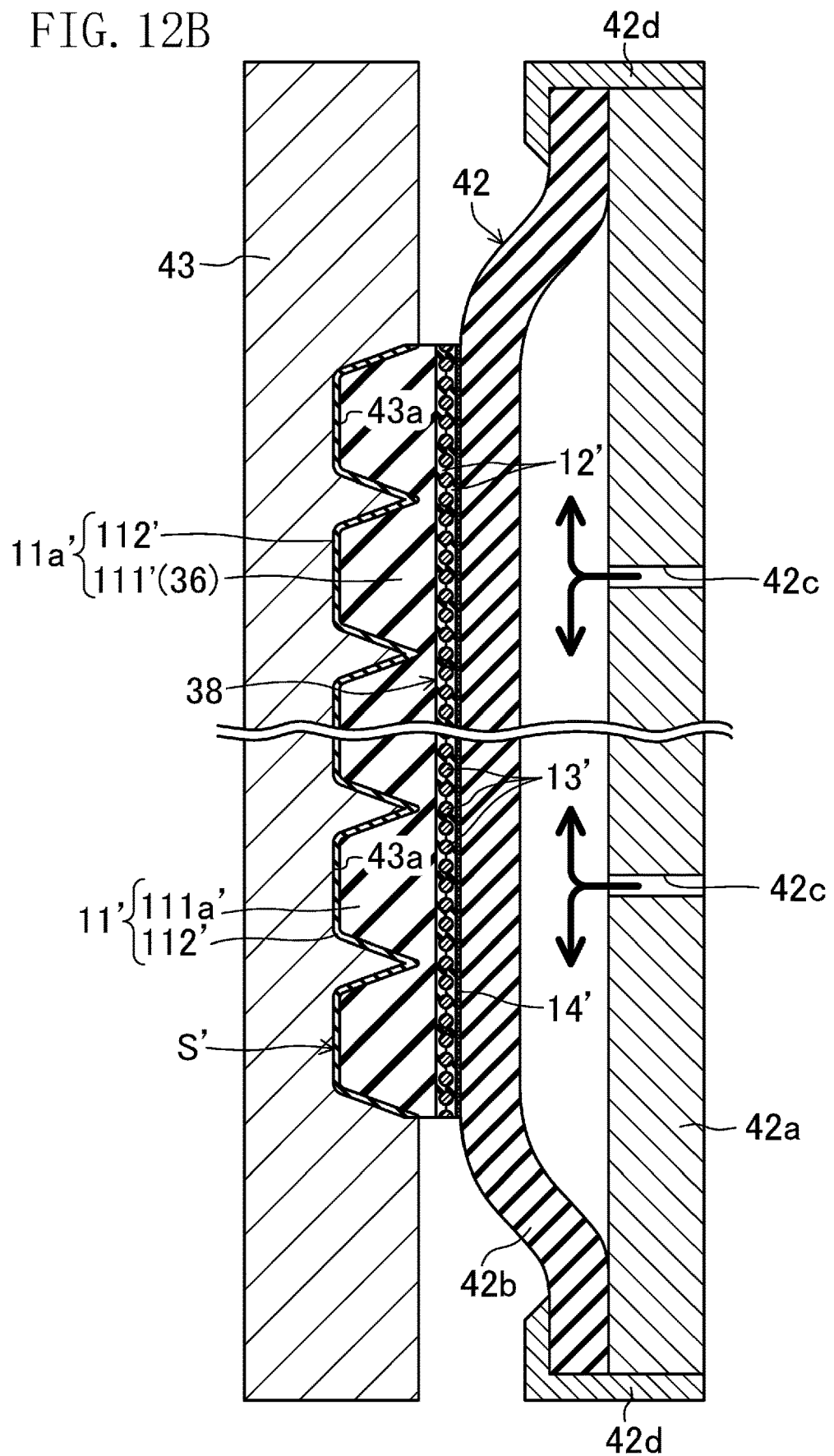
FIG. 12B is a second drawing showing the crosslinking step of the third production method.

As shown in FIG. 12B, a pressurizing means introduces high-pressure air into the drum body 42*a* of the expansion drum 42 so as to expand the expansion sleeve 42*b* radially outward. After a predetermined pressure is reached, heating is begun. This state is then maintained for a predetermined period of time. As a result, the entire surface rubber sheet 112' is heated uniformly. At this time, the uncrosslinked slab S' is pressed by the expansion sleeve 42*b* and expands radially outward, causing each of the compressed rubber layer-forming portions 11' to enter the associated one of the compressed rubber layer-shaping grooves 43*a* of the cylindrical mold 43 to be fitted therein. In this state, the uncrosslinked slab S' is heated by the cylindrical mold 43 and pressed toward the cylindrical mold 43 by the expansion sleeve 42*b*, thereby molding a belt slab S. That is, the pressing of the shaped structure 36 toward the cylindrical mold 43 is carried out by expanding the expansion sleeve 42*b*, disposed radially inward of the shaped structure 36, and pressing the shaped structure 36 from radially inside.

The other features and advantages are the same as those of the first production method.

(Fourth Production Method)

A fourth production method will be described below with reference to FIG. 13.

The fourth production method includes a shaping step in which a shaped structure 36 which has a cylindrical shape and is covered with a surface rubber sheet 112' is formed, similarly to the second production method. Further, similarly to the third production method, a crosslinking apparatus 40 including an expansion drum 42 that is attachable to, and detachable from, a base 41 is used. The expansion drum 42 is rotatably supported on a shaft of a shaping machine (not shown) such that the axis of the expansion drum 42 extends horizontally. Similarly to the second production method (see FIGS. 4A to 4C illustrating the first production method), a cylindrical tensile member 38 is formed on the expansion drum 42.

Figure 13:
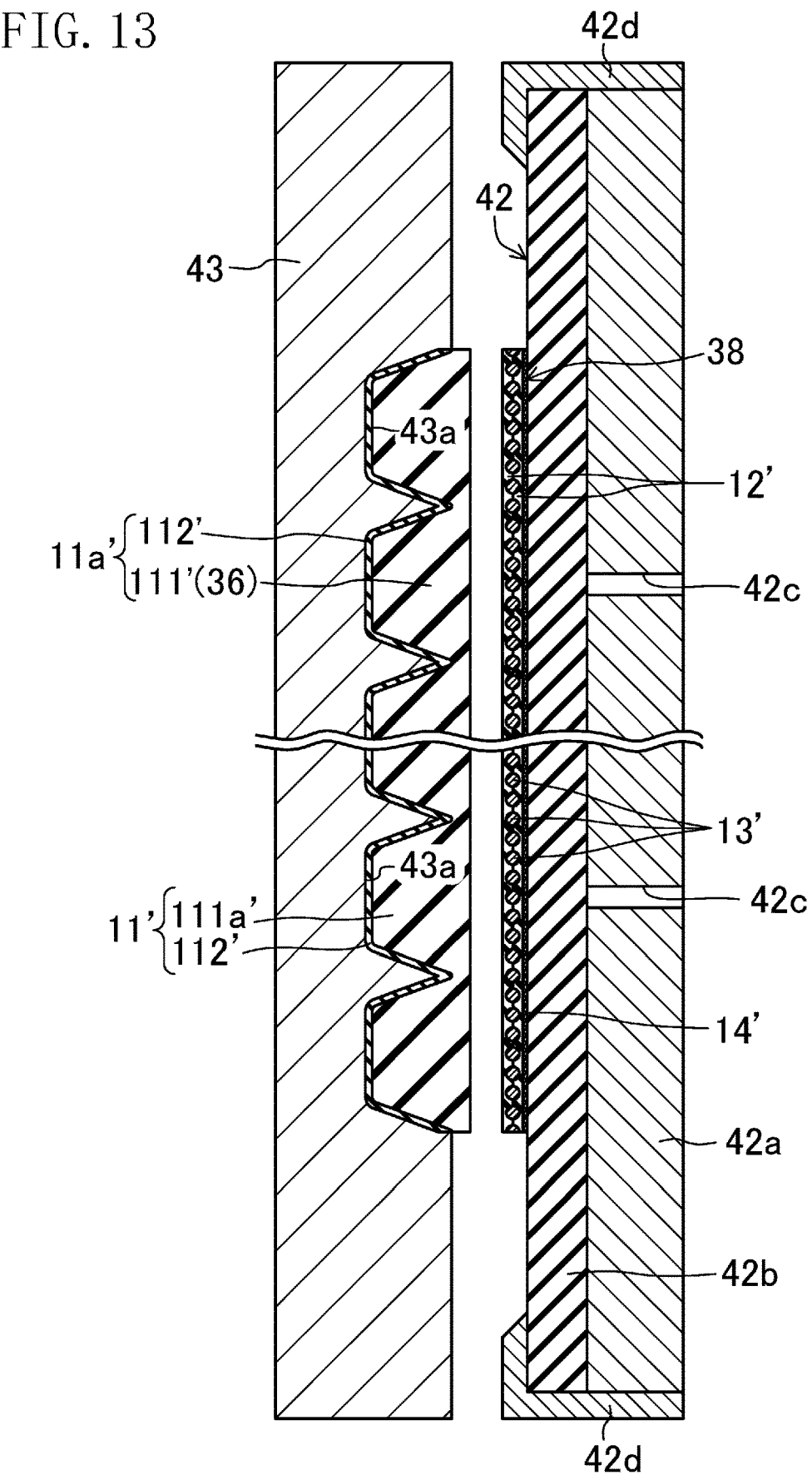
FIG. 13 shows a crosslinking step of a fourth production method.

Similarly to the second production method, in a crosslinking step, the shaped structure 36 covered with the surface rubber sheet 112' is placed in the cylindrical mold 43, as shown in FIG. 13. More specifically, the shaped structure 36 covered with the surface rubber sheet 112' is set in the cylindrical mold 43 such that each of the plurality of compressed rubber layer-forming portions 11' comprised of the core rubber layer-forming portions 111a' covered with the surface rubber sheet 112' is fitted in an associated one of the compressed rubber layer-shaping grooves 43a of the cylindrical mold 43. Fitting the compressed rubber layer-forming portions 11' in the compressed rubber layer-shaping grooves 43a in advance reduces flow in the rubber, thereby enabling production of a V-ribbed belt B having a stable structure. At this time, the shaped structure 36 and the surface rubber sheet 112' are set in the cylindrical mold 43 such that the shaped structure 36 and the surface rubber sheet 112' are positioned respectively inside and outside with respect to each other. The cylindrical mold 43 is chosen to correspond to the length of the V-ribbed belt B to be produced. Note that short fibers, resin powder, or the like may be attached in advance to the inner peripheral surface of the cylindrical mold 43 and/or the outer peripheral surface of the surface rubber sheet 112'.

The expansion drum 42 on which the tensile member 38 has been formed is detached from the shaping machine, and the expansion drum 42 is attached to the crosslinking apparatus 40 so as to stand on the base 41 of the crosslinking apparatus 40. Then, the cylindrical mold 43 within which the shaped structure 36 covered with the surface rubber sheet 112' has been set is attached to the base 41 such that the cylindrical mold 43 covers the expansion drum 42. This means that the tensile member 38, which is comprised of the uncrosslinked rubber composition shaped into a cylindrical shape and having the cord 13' embedded therein so as to form a helical pattern with pitches in the axial direction, is placed between the shaped structure 36 and the expansion sleeve 42b of the expansion drum 42. Before expansion of the expansion sleeve 42b, a gap is interposed between the shaped structure 36 and the tensile member 38, and the tensile member 38 is formed on the expansion sleeve 42b.

A pressurizing means then introduces high-pressure air into the drum body 42a of the expansion drum 42 so as to expand the expansion sleeve 42b radially outwardly. After a predetermined pressure is reached, heating is begun. This state is then maintained for a predetermined period of time. As a result, the entire surface rubber sheet 112' is heated uniformly. At this moment, the tensile member 38 is pressed by the expansion sleeve 42b and expands radially outward to come into contact with the shaped structure 36. While each of the compressed rubber layer-forming portions 11' is fitted in an associated one of the compressed rubber layer-shaping grooves 43a of the cylindrical mold 43, the tensile member 38 and the shaped structure 36 covered with the surface rubber sheet 112' are heated by the cylindrical mold 43 and pressed towards the cylindrical mold 43 by the expansion sleeve 42b, thereby molding a belt slab S. That is, the pressing of the shaped structure 36 toward the cylindrical mold 43 is carried out by expanding the expansion sleeve 42b, disposed radially inward of the shaped structure 36, and pressing the shaped structure 36 from radially inside.

The other features and advantages are the same as those of the second production method.

(Fifth Production Method)

Figure 14A:
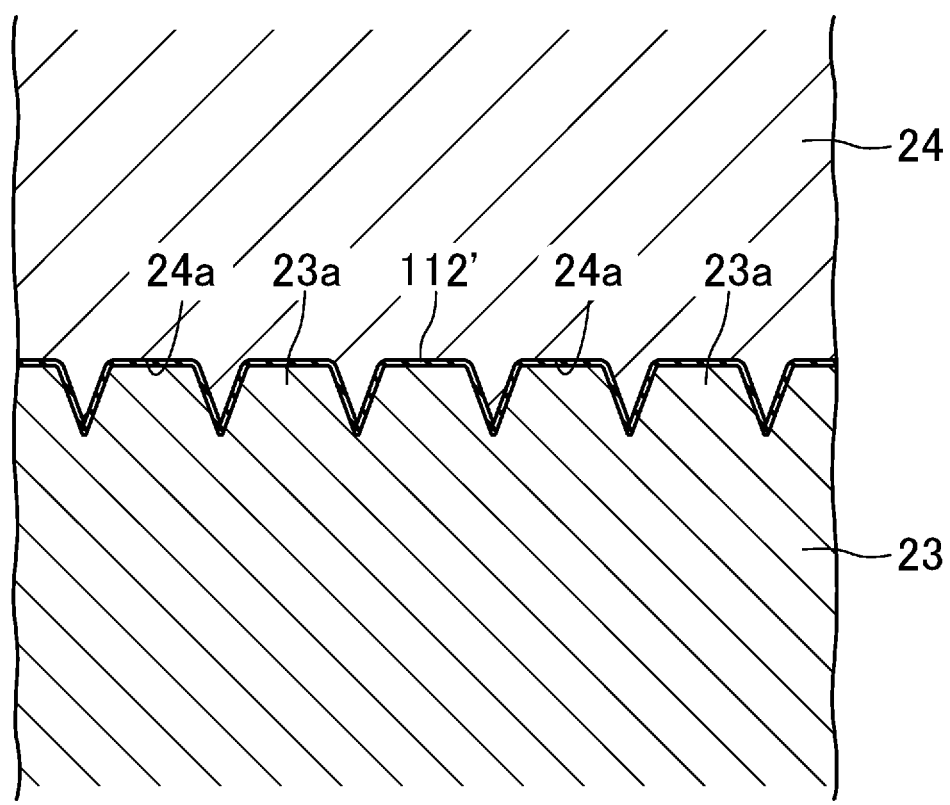
FIG. 14A is a first drawing showing how a surface rubber sheet is affixed to a core rubber sheet in a component preparation step of a fifth production method.
Figure 14B:
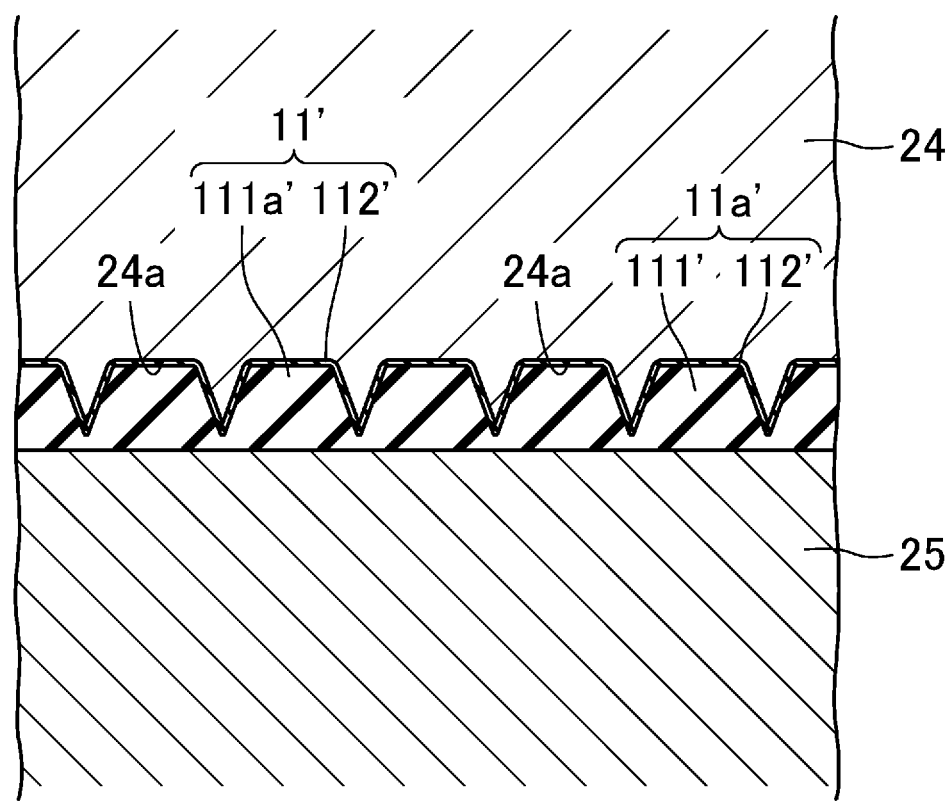
FIG. 14B is a second drawing showing how the surface rubber sheet is affixed to the core rubber sheet in the component preparation step of the fifth production method.
Figure 14C:
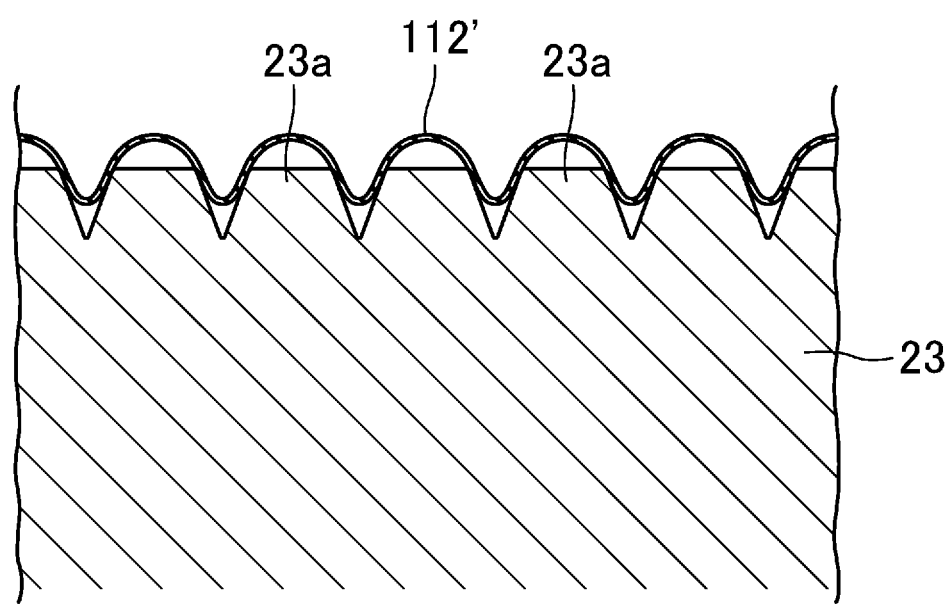
FIG. 14C is a third drawing showing how the surface rubber sheet is affixed to the core rubber sheet in the component preparation step of the fifth production method.

A fifth production method will be described below with reference to FIGS. 14A to 14C.

The fifth production method includes a shaping step in which, a core rubber sheet 111' is covered with a surface rubber sheet 112' in advance, thereby forming a compressed rubber sheet 11a' comprised of the core rubber sheet 111' covered with the surface rubber sheet 112', while forming compressed rubber layer-forming portions 11' comprised of the core rubber layer-forming portions 111a' covered with the surface rubber sheet 112'. Covering the surface of the core rubber sheet 111' with the surface rubber sheet 112' in advance reduces stretch of the surface rubber sheet 112', enabling production of the V-ribbed belt B including a surface rubber layer 112 having a uniform thickness. The surface rubber sheet 112' may be closely fitted to the core rubber sheet 111', or may simply lie along the surface of the core rubber sheet 111' instead of being closely fitted.

The core rubber sheet 111' is covered with the surface rubber sheet 112' in the following manner. As shown in FIG. 14A, a surface rubber-shaping roll 23 having trapezoidal ridges 23a that have a shape corresponding to the shape of the core rubber layer-forming portions 111a', extend in the circumferential direction, and are arranged adjacent to one another in the axial direction of the surface rubber-shaping roll 23 is meshed with a transfer roll 24 having trapezoidal grooves 24a that have a shape corresponding to the shape of the compressed rubber layer-forming portions 11', extend in the circumferential direction, and are arranged adjacent to one another in the axial direction of the transfer roll 24 such that a gap is interposed between the rolls 23 and 24. The surface rubber sheet 112' is passed between these rolls and is shaped by the surface rubber-shaping roll 23 so as to fit the surface of the transfer roll 24. Then, as shown in FIG. 14B, the core rubber sheet 111' is passed between the transfer roll 24 and a flat roll 25 such that the core rubber layer-forming portions 111a' are fitted in the trapezoidal grooves 24a of the transfer roll 24, thereby affixing the surface rubber sheet 112' to a surface of the core rubber sheet 111'. In order to enhance the productivity, it is preferable to produce the compressed rubber sheet 11a' from an uncrosslinked rubber sheet 111" and a surface rubber sheet 112' in a continuous manner, as follows: the uncrosslinked rubber sheet 111" is shaped into the core rubber sheet 111' using the core rubber-shaping roll 21 as shown in FIGS. 3A and 3B; the surface rubber sheet 112' is shaped to fit the transfer roll 24 using the surface rubber-shaping roll 23 and the transfer roll 24 as shown in FIG. 14A; and the surface rubber sheet 112' shaped with the rolls 23 and 24 is affixed to the core rubber sheet 111' shaped with the roll 21, as shown in FIG. 14B.

Covering the surface of the core rubber sheet 111' (the surfaces of the core rubber layer-forming portions 111a') with the surface rubber sheet 112' in advance, and prior to this covering process, shaping the surface rubber sheet 112' to fit the surfaces of the core rubber layer-forming portions 111a' make it possible to reduce stretch of the surface rubber sheet 112' to a small amount, enabling production of a V-ribbed belt B including a surface rubber layer 112 having a substantially uniform thickness. In order to reduce stretch of the surface rubber sheet 112' to a small amount, it is also preferable that: the surface rubber sheet 112' is subjected to a pleating process so that the cross section in the width direction is corrugated to have the same pitches as those of the core rubber layer-forming portions 111a' as in the first production method, prior to being passed over the surface rubber-shaping roll 23 followed by covering the surface of the core rubber sheet 111' (the core rubber layer-forming portions 111a'); the corrugated surface rubber sheet 112' is then set such that its portions protruding toward the core rubber sheet 111' (the core rubber layer-forming portions 111a') are positioned at grooves between the trapezoidal ridges 23a of the surface rubber-shaping roll 23, i.e., the grooves between the core rubber layer-forming portions 111a' of the core rubber sheet 111'; and the protruding portions are halfway fitted in the grooves so that the surface rubber sheet 112' loosely fits the core rubber sheet 111'.

The core rubber sheet 111' can be covered with the surface rubber sheet 112' by pressing.

In the first production method, the resultant core rubber sheet 111' covered with the surface rubber sheet 112' may be wrapped around the adhesive rubber sheet 12' to prepare an uncrosslinked slab S'. In the second production method, the resultant core rubber sheet 111' covered with the surface rubber sheet 112' may be used for producing the shaped structure 36 covered with the surface rubber sheet 112'.

The other features and advantages are the same as those of the first, second, third, or fourth production method.
(Sixth Production Method)

A sixth production method will be described below with reference to FIGS. 15A and 15B and FIGS. 16A and 16B.

The sixth production method includes a shaping step in which, in a manner as in FIGS. 4A to 4C illustrating the first production method, a reinforcing fabric 14', an adhesive rubber sheet 12', a cord 13', and another adhesive rubber sheet 12' are stacked on a shaping mandrel 31 in the stated order. After that, the entire peripheral surface of the stacked structure is pressed with a roller 32 on the adhesive rubber sheet 12' to integrate the stacked structure to form a tensile member 38, around which the core rubber sheet 111' is wrapped.

Figure 15A:
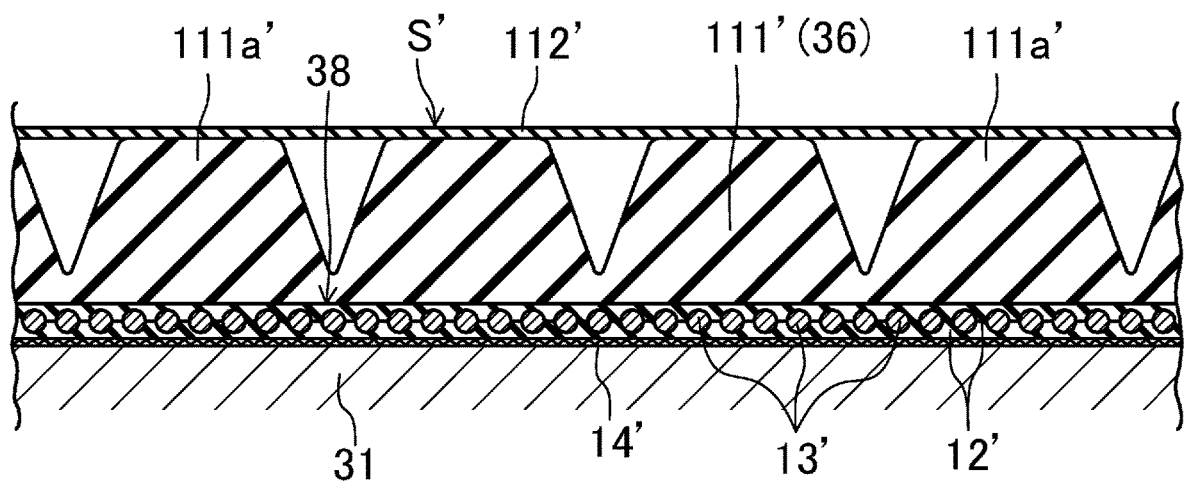
FIG. 15A shows a shaping step of a sixth production method.
Figure 15B:
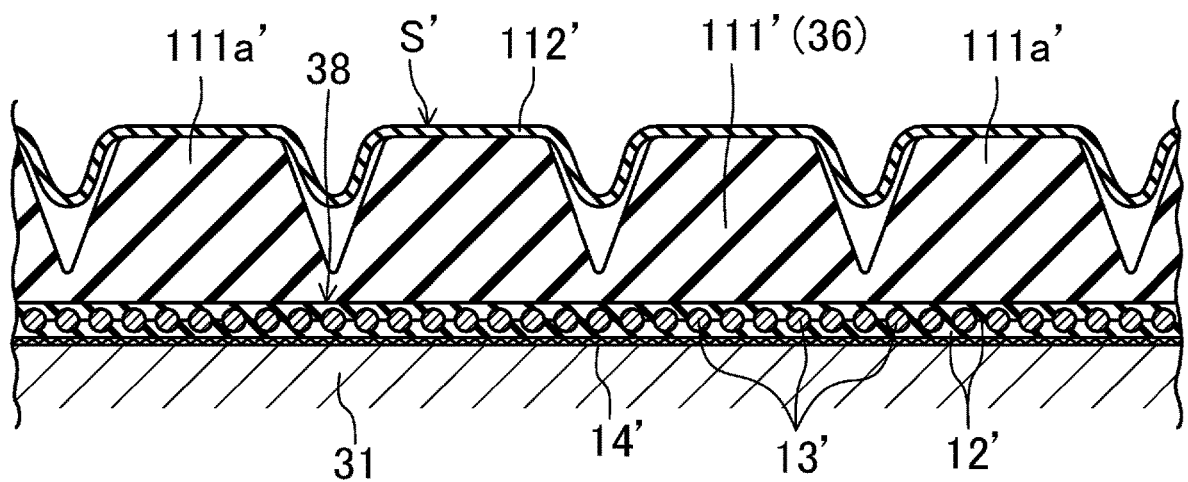
FIG. 15B shows a shaping step of a variation of the sixth production method.

Then, as shown in FIG. 15A, the surface rubber sheet 112' is wrapped around the core rubber sheet 111'. At this moment, the surface rubber sheet 112' is wrapped to have a cylindrical shape, while being supported on the tops of the core rubber layer-forming portions 111a' of the core rubber sheet 111', and layered on the core rubber sheet 111'. The surface rubber sheet 112' is cut with ultrasound, a cutter, scissors, or the like, and its ends are lap jointed together. For the purpose of reducing local stretch of the surface rubber sheet 112' to a small amount, portions of the surface rubber sheet 112' that correspond to the grooves between the core rubber layer-forming portions 111a' of the core rubber sheet 111' may be pressed into the grooves between the core rubber layer-forming portions 111a', as shown in FIG. 15B. For the same purpose, in a manner as in FIG. 4F illustrating the first production method, the surface rubber sheet 112' may be subjected to a pleating process so that the cross section in the width direction is corrugated to have the same pitches as those of the core rubber layer-forming portions 111a', and the surface rubber sheet 112' may be set such that its portion protruding toward the core rubber sheet 111' are halfway fitted in the grooves between the core rubber layer-forming portions 111a' of the core rubber sheet 111' so that the surface rubber sheet 112' loosely fits the core rubber sheet 111'. A surface rubber sheet 112' having a predetermined length may be formed into a cylindrical shape with its both ends joined together, and this surface rubber sheet 112' may be fitted over the core rubber sheet 111'. In this case, fitting the cylindrical surface rubber sheet 112' over the core rubber sheet 111' takes place on the shaping mandrel 31. Alternatively, the cylindrical surface rubber sheet 112' is fitted over the core rubber sheet 111' after the cylindrical object including the core rubber sheet 111' is removed from the shaping mandrel 31.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 111', and the surface rubber sheet 112' that are sequentially stacked toward the outside. The uncrosslinked slab S' includes the core rubber sheet 111' formed into a cylindrical shape, i.e., the shaped structure 36 which has a cylindrical shape. The shaped structure 36 is made of the uncrosslinked rubber composition and has, on its outer peripheral surface, the core rubber layer-forming portions 111a' that are comprised of the plurality of ridges extending in the circumferential direction and that are arranged adjacent to one another in the axial direction.

Figure 16A:
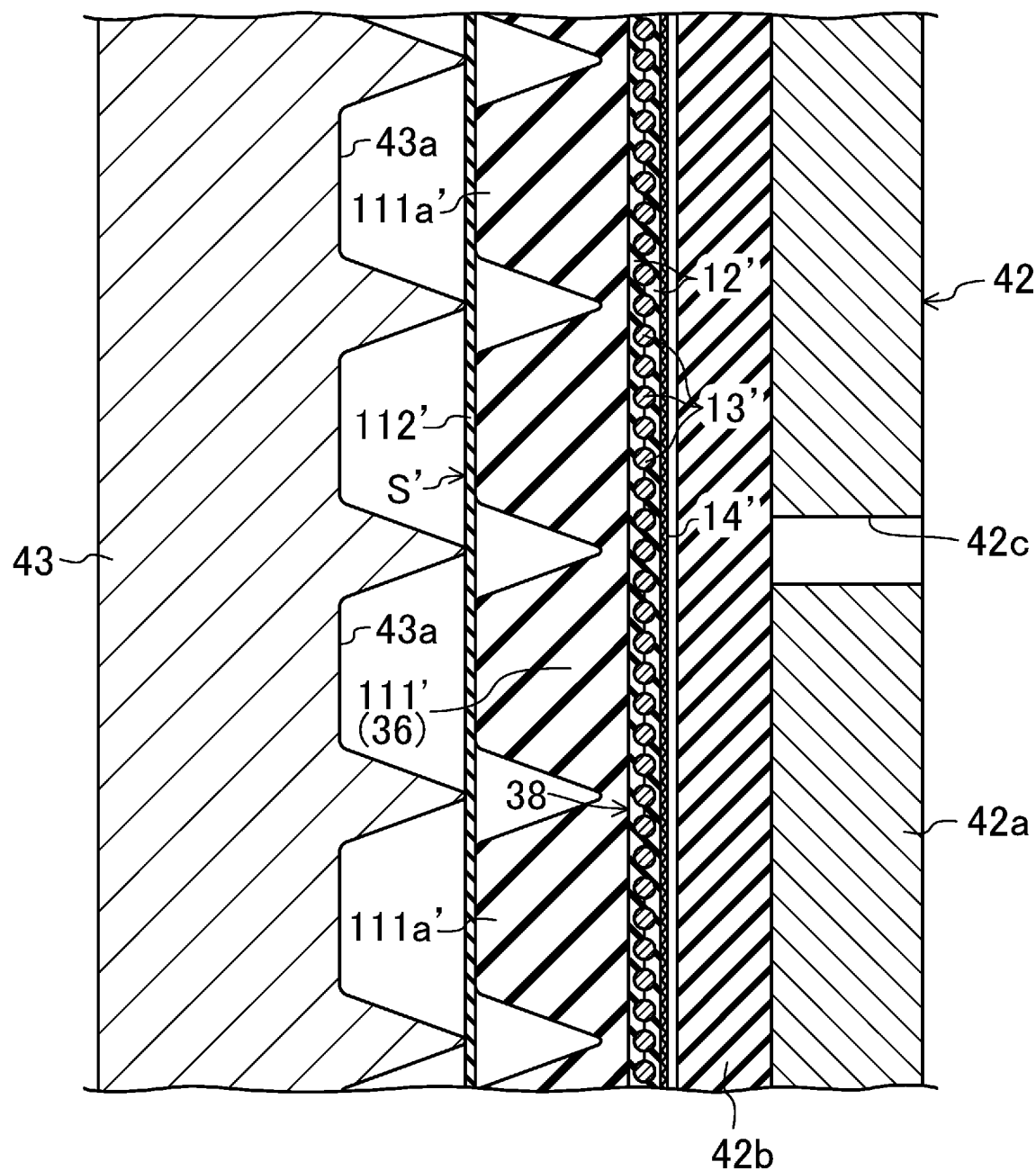
FIG. 16A is a first drawing showing a crosslinking step of the sixth production method.

As shown in FIG. 16A, in a crosslinking step, the uncrosslinked slab S' is removed from the shaping mandrel 31, and then, placed in the cylindrical mold 43 of the crosslinking apparatus 40, which has been previously detached from the base 41. More specifically, the uncrosslinked slab S' is set in the cylindrical mold 43 such that the outer peripheral surface of the surface rubber sheet 112' comes into contact with the cylindrical mold 43 at locations apart from each other, and that each of the plurality of core rubber layer-forming portions 111a' of the core rubber sheet 111' is positioned at the opening of an associated one of the compressed rubber layer-shaping grooves 43a of the cylindrical mold 43. At this time, the shaped structure 36 and the surface rubber sheet 112' are set in the cylindrical mold 43 such that the shaped structure 36 and the surface rubber sheet 112' are positioned respectively inside and outside with respect to each other. The core rubber layer-forming portions 111a' may press the surface rubber sheet 112' such that a portion of each core rubber layer-forming portion 111a' enters the associated one of the compressed rubber layer-shaping grooves 43a. This means that the tensile member 38, which is comprised of an uncrosslinked rubber composition shaped into a cylindrical shape and having the cord 13' embedded therein so as to form a helical pattern having pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the uncrosslinked slab S' in advance.

A pressurizing means then introduces high-pressure air into the drum body 42a of the expansion drum 42 so as to expand the expansion sleeve 42b radially outwardly. After a predetermined pressure is reached, heating is begun. This state is then maintained for a predetermined period of time.

Figure 16B:
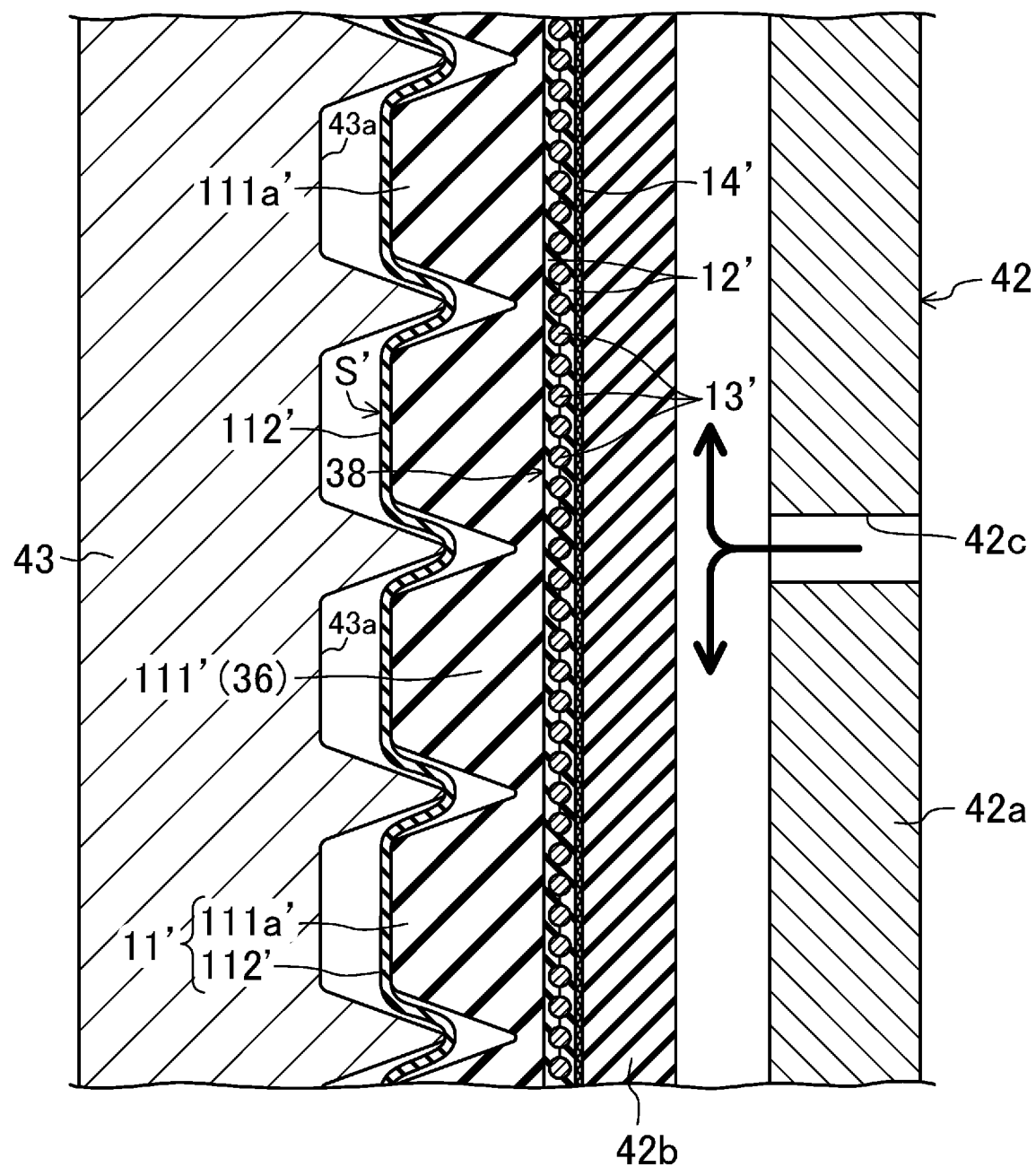
FIG. 16B is a second drawing showing the crosslinking step of the sixth production method.

As a result, the entire surface rubber sheet 112' is heated uniformly. At this moment, as shown in FIG. 16B, the uncrosslinked slab S' is pressed toward the cylindrical mold 43 by coming in contact with the expansion sleeve 42b which is expanded. That is, the pressing of the shaped structure 36 toward the cylindrical mold 43 is carried out by expanding the expansion sleeve 42b, disposed radially inward of the shaped structure 36, and pressing the shaped structure 36 from radially inside. The core rubber sheet 111' presses and stretches the surface rubber sheet 112', and is covered with the surface rubber sheet 112'. Further, each of the plurality of core rubber layer-forming portions 111a' of the core rubber sheet 111' enters an associated one of the compressed rubber layer-shaping grooves 43a of the cylindrical mold 43, while pressing and stretching the surface rubber sheet 112'. The core rubber layer-forming portion 111a' and the surface rubber sheet 112' covering the core rubber layer-forming portions 111a' together form the compressed rubber layer-forming portion 11' in the associated one of the compressed rubber layer-shaping grooves 43a. That is, the same state as in FIG. 6B illustrating the first production method is achievable at this stage. The uncrosslinked slab S' is heated by the cylindrical mold 43, while each of the compressed rubber layer-forming portions 11' (each of the core rubber layer-forming portions 111a' covered with the surface rubber sheet 112') is fitted in the associated one of the compressed rubber layer-shaping grooves 43a of the cylindrical mold 43. The rubber components of the core rubber sheet 111' and the adhesive rubber sheets 12' that are included in the uncrosslinked slab S' are crosslinked to be integrated with one another. As a result, a continuous member of belt bodies 10 for a plurality of V-ribbed belts B is produced, wherein each of the belt bodies 10 includes the core rubber layer 111 and the adhesive rubber layer 12. At the same time, the rubber components adhere to, and are combined with, the surface rubber sheet 112', the cord 13', and the reinforcing fabric 14'. A cylindrical belt slab S is thus molded eventually.

The other features and advantages are the same as those of the first production method.

The sixth production method may be applied to the third production method. In such a case, using a crosslinking apparatus 40 which is similar to that of the third production method and includes an expansion drum 42 that is attachable to, and detachable from, a base 41, the expansion drum 42 may serve also as a shaping mandrel 31 to produce the V-ribbed belt B of the embodiment.

(Seventh Production Method)

A seventh production method will be described below with reference to FIG. 17.

The seventh production method includes a shaping step in which a core rubber sheet 111' having a predetermined length is formed into a cylindrical shape with its both ends joined together such that core rubber layer-forming portions 111a' face outside. As a result, a shaped structure 36 is produced which has a cylindrical shape, is made of an uncrosslinked rubber composition, and includes, on its outer peripheral surface, the plurality of core rubber layer-forming portions 111a' extending in the circumferential direction and arranged adjacent to one another in the axial direction of the shaped structure 36. The core rubber sheet 111' is cut with ultrasound, a cutter, scissors, or the like, and its ends are butt jointed. To increase the joint strength, the butt joint is preferably achieved by abutting surfaces, of the core rubber sheet 111', which are oblique with respect to the thickness direction of the core rubber sheet 111'.

Next, the surface rubber sheet 112' is wrapped around the shaped structure 36. At this moment, the surface rubber sheet 112' is wrapped to have a cylindrical shape, while being supported on the tops of the core rubber layer-forming portions 111a' of the shaped structure 36, and layered on the shaped structure 36. The surface rubber sheet 112' is cut with ultrasound, a cutter, scissors, or the like, and its ends are lap jointed together. Alternatively, a surface rubber sheet 112' having a predetermined length may be formed into a cylindrical shape with its both ends joined together, and this cylindrically-shaped surface rubber sheet 112' may be fitted over the shaped structure 36.

Further, in a manner as in FIGS. 4A to 4C illustrating the first production method, a reinforcing fabric 14', an adhesive rubber sheet 12', a cord 13', and another adhesive rubber sheet 12' are stacked on a shaping mandrel 31 in the stated order. After that, the entire peripheral surface of the stacked structure is pressed with a roller 32 on the adhesive rubber sheet 12' to integrate the stacked structure and produce a cylindrical tensile member 38.

Figure 17:
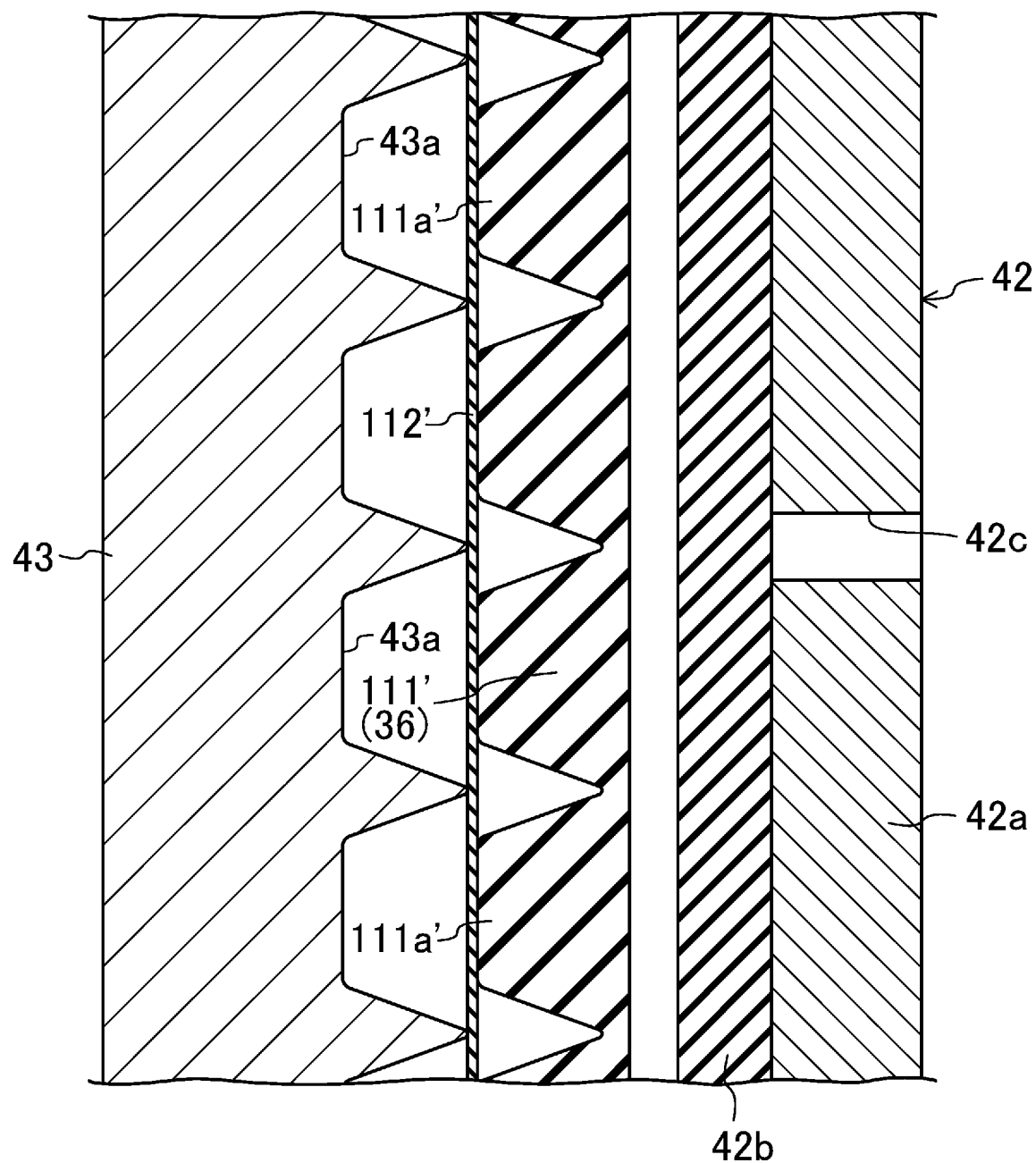
FIG. 17 shows a crosslinking step of a seventh production method.

As shown in FIG. 17, in the crosslinking step, the shaped structure 36 covered with the surface rubber sheet 112' is placed in the cylindrical mold 43 which has been removed from the base 41 of the crosslinking apparatus 40. More specifically, the shaped structure 36 covered with the surface rubber sheet 112' is set in the cylindrical mold 43 such that the outer peripheral surface of the surface rubber sheet 112' comes into contact with the cylindrical mold 43 at locations apart from each other in the axial direction, and that each of the plurality of core rubber layer-forming portions 111a' of the shaped structure 36 is positioned at the opening of an associated one of the compressed rubber layer-shaping grooves 43a of the cylindrical mold 43. At this time, the shaped structure 36 and the surface rubber sheet 112' are set in the cylindrical mold 43 such that the shaped structure 36 and the surface rubber sheet 112' are positioned respectively inside and outside with respect to each other. The core rubber layer-forming portions 111a' may press the surface rubber sheet 112' such that a portion of each core rubber layer-forming portion 111a' enters the associated one of the compressed rubber layer-shaping grooves 43a. The cylindrical mold 43 is chosen to correspond to the length of the V-ribbed belt B to be produced. Note that short fibers, resin powder, or the like may be attached in advance to the inner peripheral surface of the cylindrical mold 43 and/or the outer peripheral surface of the surface rubber sheet 112'.

The tensile member 38 is removed from the shaping mandrel 31, and is then fitted to the shaped structure 36 set in the cylindrical mold 43, such that the outer peripheral surface of the tensile member 38 comes into contact with the inner peripheral surface of the shaped structure 36, that is, so as to be in a positional relationship as in FIG. 16A illustrating the sixth production method. This means that the tensile member 38, which is comprised of an uncrosslinked rubber composition shaped into a cylindrical shape and having the cord 13' embedded therein so as to form a helical pattern having pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other.

The other features and advantages are the same as those of the sixth production method.

The seventh production method may be applied to the fourth production method. In such a case, using a crosslinking apparatus 40 which is similar to that of the fourth production method and includes an expansion drum 42 that is attachable to, and detachable from, a base 41, the expansion drum 42 may serve also as a shaping mandrel 31 to produce the V-ribbed belt B of the embodiment.

In the embodiments described above, the uncrosslinked slab S' is crosslinked by using the cylindrical mold 43. However, the present disclosure is not particularly limited to this. For example, the uncrosslinked slab is suspended between two shafts, and a portion of the uncrosslinked slab is press molded between a flat-shaped mold and a plate-shaped belt mold having a plurality of compressed rubber layer-shaping grooves which are arranged adjacent to one another in the groove width direction. The uncrosslinked slab is crosslinked while being passed in the circumferential direction.

What is claimed is:

1. A method for producing a V-ribbed belt including a compressed rubber layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a surface rubber layer, the method comprising:
   preparing a surface rubber sheet which is to constitute the surface rubber layer;
   setting a shaped structure and the surface rubber sheet in a belt mold such that the shaped structure and the surface rubber sheet are respectively positioned inside and outside with respect to each other, the shaped structure having a cylindrical shape, being made of an uncrosslinked rubber composition, and including, on an outer peripheral surface thereof, a plurality of ridges which have been formed in advance, extend in a circumferential direction, and are arranged adjacent to one another in an axial direction of the shaped structure, the belt mold including a plurality of compressed rubber layer-shaping grooves arranged in a groove width direction;
   molding a cylindrical belt slab by crosslinking the shaped structure set in the belt mold through heating and pressing the shaped structure toward the belt mold, while each of compressed rubber layer-forming portions is fitted in an associated one of the compressed rubber layer-shaping grooves of the belt mold, the compressed rubber layer-forming portions being comprised of the plurality of ridges, of the shaped structure, each covered with the surface rubber sheet and together forming the compressed rubber layer, the crosslinking involving integration of the shaped structure with the surface rubber sheet; and
   cutting the belt slab into ring-shaped pieces each including two or more of the plurality of compressed rubber layer-forming portions that are to constitute the plurality of V-shaped ribs.

2. The method of claim 1, wherein
   the belt mold has a cylindrical shape having, on an inner peripheral surface thereof, the plurality of compressed rubber layer-shaping grooves extending in a circumferential direction and arranged adjacent to one another in an axial direction of the belt mold, and
   the shaped structure is placed in the belt mold.

3. The method of claim 1, wherein
   prior to the setting the shaped structure and the surface rubber sheet in the belt mold, the ridges are covered with the surface rubber sheet, thereby forming the compressed rubber layer-forming portions.

4. The method of claim 3, wherein
   before the ridges are covered with the surface rubber sheet, the surface rubber sheet is shaped to have a corrugated cross section having same pitches as those of the ridges, and then, disposed such that portions of the surface rubber sheet protruding toward the ridges are positioned at grooves between the ridges.

5. The method of claim 4, wherein
   the surface rubber sheet which originally has a flat shape is continuously passed between a pair of plate-shaped or rolled members configured to pleat the surface rubber sheet, so that pitches of the surface rubber sheet pleated gradually decrease in a length direction.

6. The method of claim 3, wherein
   before the ridges are covered with the surface rubber sheet, the surface rubber sheet is shaped to fit surfaces of the ridges.

7. The method of claim 1, wherein
   the setting the shaped structure and the surface rubber sheet in the belt mold is carried out such that the compressed rubber layer-forming portions are fitted in the compressed rubber layer-shaping grooves.

8. The method of claim 2, wherein
   the shaped structure is pressed toward the belt mold by expanding an expansion sleeve disposed inward of the shaped structure and by causing the expansion sleeve to press the shaped structure from inside.

9. The method of claim 8, wherein
   a tensile member is provided between the shaped structure and the expansion sleeve, the tensile member being comprised of an uncrosslinked rubber composition formed into a cylindrical shape and having a cord embedded therein and forming a helical pattern with pitches in an axial direction of the tensile member.

10. The method of claim 9, wherein
    the tensile member is provided on the expansion sleeve before the expansion sleeve is expanded.

11. The method of claim 9, wherein
    a gap is provided between the tensile member and the expansion sleeve before the expansion sleeve is expanded.

12. The method of claim 10, wherein
    the shaped structure and the tensile member are brought into contact with each other before the expansion sleeve is expanded.

13. The method of claim 10, wherein
    a gap is provided between the shaped structure and the tensile member before the expansion sleeve is expanded.

14. A method for producing a V-ribbed belt including a compressed rubber layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a surface rubber layer, the method comprising:
    setting a shaped structure and a surface rubber sheet which is to constitute the surface rubber layer in a belt mold such that the shaped structure and the surface rubber sheet are respectively positioned inside and outside with respect to each other, the shaped structure having a cylindrical shape, being made of an uncrosslinked rubber composition, including, on an outer peripheral surface thereof, a plurality of ridges extending in a circumferential direction and arranged adjacent to each other in an axial direction of the shaped structure, the belt mold including a plurality of compressed rubber layer-shaping grooves arranged in a groove width direction;

molding a cylindrical belt slab by crosslinking the shaped structure set in the belt mold through heating and pressing the shaped structure toward the belt mold, while each of compressed rubber layer-forming portions is fitted in an associated one of the compressed rubber layer-shaping grooves of the belt mold, the compressed rubber layer-forming portions being comprised of the plurality of ridges, of the shaped structure, each covered with the surface rubber sheet and together forming the compressed rubber layer, the crosslinking involving integration of the shaped structure with the surface rubber sheet; and cutting the belt slab into ring-shaped pieces each including two or more of the plurality of compressed rubber layer-forming portions that are to constitute the plurality of V-shaped ribs, wherein prior to setting the shaped structure and the surface rubber sheet in the belt mold, the ridges are covered with the surface rubber sheet, thereby forming the compressed rubber layer-forming portions, before the ridges are covered with the surface rubber sheet, the surface rubber sheet is shaped to have a corrugated cross section having same pitches as those of the ridges, and then, disposed such that portions of the surface rubber sheet protruding toward the ridges are positioned at grooves between the ridges, and the surface rubber sheet which originally has a flat shape is continuously passed between a pair of plate-shaped or rolled members configured to pleat the surface rubber sheet, so that pitches of the surface rubber sheet pleated gradually decrease in a length direction.

15. The method of claim 2, wherein
the surface rubber sheet is in contact with the inner peripheral surface of the belt mold prior to the pressing the shaped structure toward the belt mold.

16. The method of claim 15, wherein
the surface rubber sheet is in contact with the inner peripheral surface of the belt mold at locations apart from each other in the axial direction of the belt mold.

17. A method for producing a V-ribbed belt including a compressed rubber layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a surface rubber layer, the method comprising:

forming a shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure;

after formation of the ridges, forming compressed rubber layer-forming portions, which are to constitute the V-shaped ribs, by covering each of the ridges with the surface rubber sheet, which is to constitute the surface rubber layer;

molding a cylindrical belt slab by using a belt mold including a plurality of compressed rubber layer-shaping grooves arranged in a groove width direction, and by crosslinking the shaped structure, which has been formed in the forming the shaped structure, through heating and pressing the shaped structure toward the belt mold, while each of compressed rubber layer-forming portions, which have been formed in the forming the compressed rubber layer-forming portions, is fitted in an associated one of the compressed rubber layer-shaping grooves of the belt mold, the crosslinking involving integration of the shaped structure with the surface rubber sheet; and cutting the belt slab into ring-shaped pieces each including two or more of the plurality of compressed rubber layer-forming portions that are to constitute the plurality of V-shaped ribs.

18. The method of claim 17, further comprising:
forming a rubber sheet to be used to form the shaped structure, the rubber sheet being made of the uncrosslinked rubber composition and including the plurality of ridges extending parallel to, and adjacent to, one another.

19. The method of claim 18, wherein
the forming the compressed rubber layer-forming portions is carried out after the forming the shaped structure.

* * * * *